United States Patent
Gregory et al.

(10) Patent No.: US 11,753,029 B1
(45) Date of Patent: Sep. 12, 2023

(54) OFF-SCREEN OBJECT INDICATIONS FOR A VEHICLE USER INTERFACE

(71) Applicant: Zoox, Inc., Foster City, CA (US)

(72) Inventors: James Peter Gregory, Foster City, CA (US); Rose Lin, San Francisco, CA (US); Dylan Phan, Foster City, CA (US); Dennis Schaefer, San Mateo, CA (US); Lilith Rogue Automata, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 273 days.

(21) Appl. No.: 17/124,297

(22) Filed: Dec. 16, 2020

(51) Int. Cl.
*B60W 50/14* (2020.01)
*G06V 20/58* (2022.01)
*B60K 37/02* (2006.01)

(52) U.S. Cl.
CPC ............ *B60W 50/14* (2013.01); *B60K 37/02* (2013.01); *G06V 20/58* (2022.01); *B60K 2370/152* (2019.05); *B60K 2370/166* (2019.05); *B60K 2370/178* (2019.05); *B60K 2370/179* (2019.05); *B60W 2050/146* (2013.01); *B60W 2554/4041* (2020.02); *B60W 2554/4042* (2020.02)

(58) Field of Classification Search
CPC ......... B60W 50/14; B60W 2554/4041; B60W 2554/4042; B60W 2050/146; G06V 20/58; B60K 37/02; B60K 2370/152; B60K 2370/166; B60K 2370/178; B60K 2370/179; B60K 2370/11; G05D 1/0044
See application file for complete search history.

(56) References Cited

U.S. PATENT DOCUMENTS

| 10,268,191 | B1* | 4/2019 | Lockwood | G05D 1/0038 |
| 11,180,159 | B1* | 11/2021 | Post | B60W 50/14 |
| 2010/0253918 | A1* | 10/2010 | Seder | G01S 13/867 |
| | | | | 353/13 |
| 2014/0362195 | A1* | 12/2014 | Ng-Thow-Hing | G06V 40/20 |
| | | | | 348/51 |
| 2016/0063761 | A1* | 3/2016 | Sisbot | G06T 19/006 |
| | | | | 345/633 |

(Continued)

FOREIGN PATENT DOCUMENTS

WO WO-2017047079 A1 * 3/2017 ............. B60K 35/00

*Primary Examiner* — Navid Z. Mehdizadeh
*Assistant Examiner* — Kenneth M Dunne
(74) *Attorney, Agent, or Firm* — Lee & Hayes, P.C.

(57) ABSTRACT

Techniques for presenting a user interface on a display for monitoring and/or controlling a vehicle. The user interface may include a digital representation of an environment in which the vehicle is operation. Additionally, the user interface may include system interface that is configured to display one or more notifications associated with systems or components of the vehicle. The system interface may additionally, or alternatively, comprise one or more control inputs for controlling systems or components of the vehicle. The user interface may also include a mission interface that includes a map interface and a mission selection interface for selecting routes the vehicle is to navigate. The user interface may additionally cause presentation of visual indicators that indicate the presence of an object that is not shown on the user interface, but that is moving in a direction such that the object will soon be visibly displayed on the user interface.

20 Claims, 15 Drawing Sheets

(56) References Cited

U.S. PATENT DOCUMENTS

| | | | |
|---|---|---|---|
| 2016/0075332 A1* | 3/2016 | Edo-Ros | B60W 30/0953 |
| | | | 701/70 |
| 2017/0268896 A1* | 9/2017 | Bai | G08G 1/0141 |
| 2017/0327094 A1* | 11/2017 | Inoue | B60W 30/09 |
| 2018/0137373 A1* | 5/2018 | Rasmusson, Jr. | G06V 20/56 |
| 2018/0165838 A1* | 6/2018 | Ganesh | G06T 19/00 |
| 2018/0233048 A1* | 8/2018 | Andersson | G08G 1/166 |
| 2019/0077417 A1* | 3/2019 | Kleen | G06T 19/006 |
| 2019/0079717 A1* | 3/2019 | Lee | B60K 37/06 |
| 2020/0065597 A1* | 2/2020 | Bade | B60W 30/08 |
| 2020/0193311 A1* | 6/2020 | Myers | G06N 5/045 |
| 2020/0207358 A1* | 7/2020 | Katz | G01C 21/3697 |
| 2021/0031793 A1* | 2/2021 | Stayton | H04W 4/46 |
| 2021/0191394 A1* | 6/2021 | Dudley | G05D 1/0061 |
| 2021/0300402 A1* | 9/2021 | Wendland | B60W 30/0956 |
| 2021/0334555 A1* | 10/2021 | Duan | G06V 20/58 |
| 2022/0171382 A1* | 6/2022 | Austria | G05D 1/0027 |
| 2022/0189307 A1* | 6/2022 | Shmueli Friedland | |
| | | | G08G 1/166 |

* cited by examiner

OFF-SCREEN OBJECT INDICATIONS FOR A VEHICLE USER INTERFACE

BACKGROUND

Fleets of vehicles are used to transport people or cargo from one location to another. Individual vehicles in the fleet of vehicles may be equipped with various sensors for generating data associated with the vehicle's surroundings. Sensor data may also be used for monitoring individual vehicles of the fleet of vehicles. In some cases, an operator may monitor a vehicle, including the vehicle's performance, using an electronic device or display screen. The electronic device or display screen may present the sensor data to the operator so that they can monitor the vehicle. However, there remains a need for improved systems for monitoring vehicles that provides useful information that is easily accessed by a user who is monitoring the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
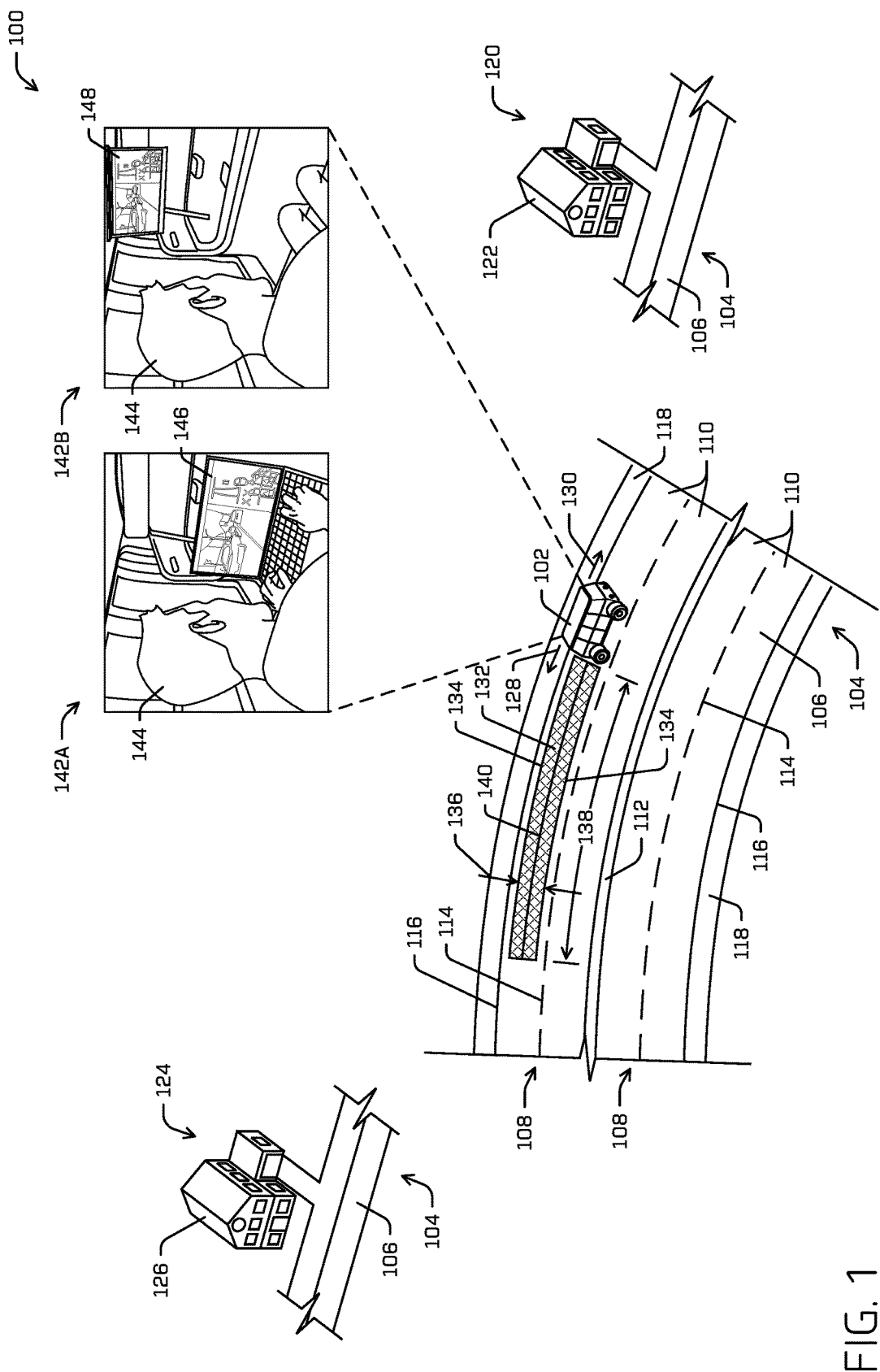
FIG. 1 illustrates a schematic diagram of an example environment through which an example vehicle travels while being monitored by an occupant of the vehicle.

As discussed above, fleets of vehicles are used to transport people or cargo from one location to another. Individual vehicles in the fleet of vehicles may be equipped with various sensors for generating data associated with the vehicle's surroundings, in addition to, or alternatively to, message data generated from one or more components or subcomponents of the vehicle. Such data may also be used for monitoring individual vehicles of the fleet of vehicles. In some cases, an operator of the vehicle may monitor an individual vehicle, including the individual vehicle's performance, using an electronic device or display screen. In various examples, such an operator as described herein may be remotely located from the vehicle and/or located within the vehicle. The electronic device or display screen may present information based on the data to the operator so that they can monitor the vehicle. In some examples, the user interface or a portion thereof may be presented to one or more passengers of the vehicle to convey to the passengers how the vehicle sees the environment, to convey current or planned actions of the vehicle, and/or otherwise convey one or more status messages relating to the operation of the vehicle.

This application relates to an improved user interface for monitoring and/or controlling a vehicle. In some examples, the user interface may provide information associated with the vehicle, such as a current state of the vehicle, a current geographic location of the vehicle, a current environment in which the vehicle is operating, and the like. For instance, based at least in part on data received from one or more sensors of the vehicle (e.g., LIDAR sensors, RADAR sensors, cameras, etc.) or other sources (e.g., sensors of one or more other vehicles, sensors located in the environment, etc.), message data from one or more components or subcomponents, map data, and/or data received from a remote operations service, the user interface may present a digital representation of an environment in which the vehicle is operating. The digital representation of the environment may include, for example, a digital representations of the vehicle in the environment, other vehicles that are in the environment, pedestrians in the environment, a road network that the vehicle is navigating, traffic lights and/or traffic signage, and the like. Such representations may include, for example, the sensor data, bounding boxes, meshes, icons, or any other representation of the data as described herein. Additionally, in some instances, the digital representation of the environment may include notifications of objects that are disposed outside of a field-of-view of the user interface but that will eventually enter the field-of-view. According to these techniques, the user interface may provide an accurate and real-time or near real-time representation of the state of the vehicle, geographic location of the vehicle, and/or environment in which the vehicle is operating.

In some examples, the user interface may include multiple interfaces that comprises different functionality. For example, the user interface may include a system interface for providing control of and/or information associated with components and/or systems of the vehicle. In some examples, the system interface may include/display one or more notifications (e.g., diagnostic messages, alert messages, status messages, and the like) associated with the components and/or systems of the vehicle. Additionally, or alternatively, the system interface may include one or more control inputs for controlling the components and/or systems of the vehicle (e.g., by activating or deactivating a software component responsible for processing sensor data associated with a respective component or system). The components and/or systems of the vehicle may include, in some examples, Light Detection and Ranging (LIDAR) systems, Radio Detection and Ranging (RADAR) systems, camera systems, perception systems, and the like. In this way, the user interface may provide notifications to a user in real-time or near real-time for monitoring the components and/or systems of the vehicle, while also allowing the user to isolate individual systems and/or components (e.g., by activating or deactivating various systems or components) of the vehicle for troubleshooting. The system interface may also include controls (e.g., input elements) usable to easily document or record information such as notifications, vehicle state information, vehicle operations, sensor data, and the like for further examination or processing at a later time. The controls to document information provide a streamlined way for an operator or other user to document information quickly without distracting the operator's attention from monitoring the vehicle's progress through the environment.

In addition to the system interface, in some examples the user interface may also include a mission interface that is configured to provide, among other things, route selection and navigation. In some examples, a user may choose to display the mission interface instead of displaying the system interface, and vice-versa. Additionally, or alternatively, the user may choose to display both the mission interface and the system interface simultaneously. In some examples, the mission interface may include a route selection element that enables a user to search for a specific route, destination, waypoint, etc. Additionally, the mission interface may include a map interface. In some examples, the map interface may display a current location of the vehicle, a current route the vehicle is navigating, a future route the vehicle may navigate, a road network, and the like. In this way, the mission interface may provide a user with the ability to view the vehicle's current location and select routes for the vehicle to navigate, while also allowing the user to see the route displayed on the map interface before choosing to navigate the route.

According to the techniques described in this disclosure, an improved user interface for monitoring a vehicle may be realized. The improved user interface provides vehicular information to users in a way that can be easily accessed and understood, while also minimizing the number of devices or interfaces needed to display the information in an efficient and organized manner. For instance, an operator of a vehicle needs to be provided with enough data/information associated with an environment in which the vehicle is operating to be able to make informed decisions in a safety critical environment. However, due to the large quantities of data/information that may be displayed on a vehicular user interface at a given point in time (e.g., when a vehicle is at an intersection where multiple other vehicles, multiple pedestrians, multiple cyclists, etc. may be present), vehicular user interfaces previously struggled to present enough relevant data/information so that operators could make informed and safe decisions. Instead, previous user interfaces either presented too much data/information, which resulted in overloading and overwhelming operators so that they could not comprehend the data/information that was being presented on previous user interfaces, or not enough information, which led to operators making poor decisions as to how to control the vehicle. However, this disclosure solves these problems by providing a user interface that presents relevant data/information in an easy to comprehend way so that operators may make informed and safe decisions, while suppressing irrelevant information that may be distracting to an operator.

Additionally, according to the techniques described herein, an operator of a vehicle may be informed of safety critical issues related to the vehicle and accordingly make prompt, informed decisions to avoid unsafe situations. For instance, the techniques of this disclosure include presenting notifications (e.g., diagnostic messages) associated with various components or systems of a vehicle. In this way, an operator may receive an indication on the user interface that a component or system of the vehicle is not functioning properly and instantly be able to respond to the indication using the same user interface to cause the vehicle to perform a safe stop. This has the effect to reduce vehicle collisions due to malfunctions in vehicle components or systems, as well as to aid in troubleshooting of those components or systems.

By way of example and not limitation, a method according to the various techniques described in this disclosure may include causing presentation, on a display, of a user interface that is associated with a vehicle. In some examples, the vehicle may comprise an autonomous vehicle that is bidirectional, meaning that it is capable of operating in a first forward direction and a second forward direction that is opposite the first forward direction. The vehicle may comprise an automobile, tuck, bus, rail vehicle (e.g., locomotive), watercraft, aircraft, and the like.

In some instances, the user interface may comprise a digital representation of an environment in which the vehicle operates. The digital representation of the environment may include a digital representation of a portion of the environment in which the vehicle operates. Additionally, the digital representation of the environment may be presented on a first portion of the display (e.g., within a first region of the display that is less than the entire size of the display). The digital representation of the environment may depict the vehicle and/or the environment as seen from one or more perspective viewpoints. For instance, a first perspective viewpoint may be a bird's eye perspective that includes the digital representation of the environment as well as a digital representation of the vehicle as it traverses the environment as seen from an aerial or third-person perspective viewpoint. The first perspective viewpoint may indicate a location of the vehicle within the environment. Additionally, or alternatively, a second perspective viewpoint may include a point of view perspective that includes the digital representation of the environment as seen from a perspective viewpoint of the vehicle itself (e.g., from a top center or front of the vehicle) or an occupant of the vehicle. The point of view perspective may be oriented forward (e.g., in a direction of travel of the vehicle), rearward (e.g., opposite a direction of travel of the vehicle), or to either lateral side of the vehicle. In some examples, the user interface may include controls allowing a user to switch between different perspectives and/or choose from among multiple available perspectives including, but not limited to, those described herein.

Additionally, in various examples the digital representation of the environment may further include a digital representation of a road network that the vehicle is navigating, such as lane markings, junctions, road segments, and the like. The digital representation of the environment may additionally include one or more digital representations of objects that are disposed within the environment, such as other vehicles, pedestrians, cyclists, structures (e.g., buildings), traffic lights and/or traffic signage, and the like. The one or more objects may be positioned within the digital representation of the environment at locations that correspond to their respective locations within the environment. The digital representation of the environment, vehicle, objects, and/or road network may include computer generated graphical elements having size, shape, color, and/or other visual cues to quickly convey information to the operator, in a way that is easily understood by the operator, about how the vehicle perceives the environment and the objects therein.

For instance, the method may include receiving data representing an object that is disposed within the environment and, based at least in part on the data, causing presentation of a digital representation of the object within the digital representation of the environment. Additionally, a shape of the digital representation of the object may visually convey an object type associated with the object. That is, in some examples, a shape of the digital representation of the object may visually convey that the object is another vehicle, a pedestrian, a cyclist, a building, etc. Additionally, in some instances, a color of the digital representation of the object may visually convey a state associated with the object (e.g., whether a car is parked or moving, whether a pedestrian is in a crosswalk or on a sidewalk, etc.). For example, a pedestrian may be represented as a first color (e.g., yellow), but if the pedestrian enters a cross walk and the vehicle must yield to the pedestrian, then the pedestrian may be represented as a second color (e.g., orange) to indicate that the vehicle is to yield to the pedestrian.

In some examples, the user interface may also comprise a system interface. The system interface may be presented on a second portion of the display (e.g., within a second region of the display that is less than the entire size of the display). In some instances, the second portion of the display may partially overlap the first portion of the display described above.

In some examples, the system interface may include multiple notifications associated with components or systems of the vehicle. That is, the multiple notifications may be presented on the display within the system interface. In some examples, the multiple notifications may comprise multiple diagnostic messages that are associated with the components, subcomponents, systems, or subsystems of the vehicle. The multiple diagnostic messages may indicate a state of a specific component or system of the vehicle, such as if a specific system or component is in a normal or nominative state, a failed state, an unresponsive state, a cautionary state, and the like. As non-limiting examples, such messages may be associated with a battery state, a perception component state, uncertainty levels associated with detections, brake system status, HVAC systems, etc.

Additionally, or alternatively, in some examples the system interface may further comprise multiple control inputs for controlling the components or systems of the vehicle. For example, a control input may be used by the operator to activate and deactivate a specific system or component of the vehicle. In some instances, the system interface may include an input element that, when selected, is configured to cause presentation of additional notifications while suppressing presentation of the multiple control inputs. In this way, more notifications can be viewed at a given point in time using the system interface.

In some examples, the system interface may include a single input element that may be configured to activate (e.g., startup) and/or deactivate (e.g., shutdown) the components or systems of the vehicle. In some examples, to prevent this input element from causing unwanted activations and/or deactivations of the components or systems of the vehicle (e.g., by an operator mistakenly or negligently pressing the input), the input element may need to be selected for more than a threshold period of time to activate and/or deactivate the components or systems of the vehicle (e.g., the input element may need to be clicked and/or pressed and held for more than, for instance, two seconds). Accordingly, when the input element is selected for more than the threshold period of time, all of the components or systems of the vehicle may be activated and/or deactivated. In additional or alternative examples, the single input element to activate and/or deactivate the components and systems may comprise multiple input elements (e.g., a first input element configured to activate all the components or systems of the vehicle may be displayed within the system interface and a second input element configured to deactivate all the components or systems of the vehicle may be displayed within the system interface).

In some examples, information associated with respective ones of the multiple notifications may be displayed. The information may comprise text data representing diagnostic information that is indicative of a status associated with a specific component or system of the vehicle. Additionally, or alternatively, the information may comprise sensor data, timestamp data representing a time that a notification was issued, vehicle state information, vehicle operations information, and the like. In examples, when an individual notification is displayed a portion of the information associated with the individual notification may be displayed, such as a name of the notification, a system or component of the vehicle that is associated with the notification, a severity of the notification, a type of the notification, etc. In some examples, individual notifications may be selected and, based at least in part on an individual notification being selected, additional information associated with the notification may be displayed. In other words, if a notification is unselected, a portion of the information associated with the notification may be visibly displayed, whereas if the notification is selected, all of the information associated with the notification may be visibly displayed.

In various examples, a method according to the techniques described herein may include causing presentation, on the display, of an input element that is configured to copy (hereinafter referred to as "copy input element") at least a portion of the information associated with a notification of the multiple notifications. The copy input element may be presented in one or more various locations on the display. For instance, in at least one example the copy input element may be presented on the display within an individual notification of the multiple notifications when a mouse cursor (or similarly, a user's finger, stylus, etc. if the display comprises a touch screen display) is proximate the individual notification. Additionally, or alternatively, if an individual notification is selected such that all of the information associated with the notification is presented on the display, the copy input element may be presented at a location on the display proximate the information.

In some instances, the copy input element may be configured to copy some or all of the information associated with the notification. For instance, the copy input element, when selected, may give a user an option as to what information to copy, or, in some examples, may copy any information that is highlighted by a user. Additionally, whether the copy input element is configured to copy some or all of the information may be based at least in part on how and/or where the copy input element is presented on the display. For instance, if the copy input element is presented on the display within an individual notification when a mouse cursor is proximate the individual notification, then the copy input element may be configured to copy a portion of the information associated with the notification. Additionally, or alternatively, if a notification is selected and the copy input element is presented at a location proximate all the information associated with the notification, then the copy input element may be configured to copy all of the information (e.g., any visible information that is currently being displayed by the user interface, including, in some examples, information that is not being displayed by the user interface but is associated with the notification).

In some examples, based at least in part on receiving a selection of the copy input element, the method may include causing the portion of the information to be stored in a memory associated with the vehicle. For instance, when the copy input element is selected, the information may be copied to a clipboard or other temporary storage associated with at least one of the vehicle or the user interface. In various examples, the user interface may include a note-taking interface that is configured to provide the user interface with the capability of logging notes. For instance, the note-taking interface may include a text field input that is useable to type and save notes generated by a user. Additionally, the text field of the note-taking interface may be configured such that a user may paste information that is stored on the clipboard into the text field such that the information may be stored in the memory associated with the vehicle or another memory for later review. In this way, information associated with a notification may be stored for later review and/or troubleshooting. In some examples, when a note is generated by the user, the note-taking interface may include a timestamp or other identifier usable to associate the note or the notification copied to the clipboard with a state of the vehicle at the time the note was taken, sensor data captured at the time the note was taken, etc.

In some examples, when a note is saved using the user interface, the note may be associated with a hashtag. The hashtag may indicate a subject-matter that the note relates to. For instance, an example hashtag may be "#error" which is associated with notes that include error-related subject-matter. In some examples, the user interface may automatically assign a hashtag to a note based on analyzing the note to identify the subject-matter of the note.

In various examples, and as briefly noted above, the user interface may additionally comprise multiple interface selection elements. The interface selection elements may provide the user interface with the ability to quickly and easily open an interface, close an interface, change between interfaces (e.g., from the system interface to a mission interface), and the like. For instance, a first interface selection element may correspond with the system interface, a second interface selection element may correspond with the mission interface, a third interface selection element may correspond with a settings interface, and so forth. Accordingly, the method may include receiving a selection of a mission interface element of the multiple interface selection elements and, based at least in part on the selection of the mission interface element, causing presentation of a mission interface while suppressing presentation of the system interface.

In some examples, the mission interface may include various elements, components, and interfaces. For instance, the mission interface may include a route selection element for selecting one or more routes that the vehicle is to navigate, a destination that the vehicle is to navigate to, waypoints that the vehicle is to navigate through, and the like. In some examples, the mission interface may additionally or alternatively include a mapping interface. The mapping interface may show a current location of the vehicle with respect to a road network, routes that the vehicle is to navigate, destinations the vehicle is to navigate to, a planned trajectory of the vehicle, and the like. In some examples, the mission interface may also include a route queue interface that displays various routes that the vehicle will be navigating after finishing a current route.

In examples, a user may select a route that the vehicle is to navigate, and the route may be displayed on the map interface. Additionally, the location of the vehicle with respect to the route may also be shown on the map interface. In at least one example, a route displayed on the map interface may comprise one or more colors, shading, a gradient, and/or the like to indicate a starting point of the route in contrast to a destination point of the route. By way of example, and not limitation if a color of the route shown on the map is green, then a starting point of the route may be colored light green and a destination point of the route may be colored dark green, and the color of the route may evenly transition from light green to dark green between the starting point and the destination point.

Additionally, some of the techniques described in this disclosure include causing presentation, on a display, of a visual indicator to indicate that an object is not shown on the display but is nearby and/or will soon appear on the display proximate a position of the visual indicator. By way of example, and not limitation, another example method according to the techniques described herein may include receiving sensor data associated with an environment in which a vehicle is operating. The sensor data may be generated by one or more systems or components of the vehicle, such as a LIDAR system, RADAR system, cameras, etc. These systems and/or components will be described in further detail below.

The method may also include causing presentation, on a display, of a user interface comprising a digital representation of a first portion of the environment associated with a first field-of-view. The digital representation of the first portion of the environment may include one or more digital representations of the vehicle, other vehicles, pedestrians, cyclists, structures and buildings, a road network, including lane markings, traffic signage, etc., and the like. For instance, based at least in part on the sensor data, one or more objects (e.g., pedestrians, vehicles, cyclists, etc.) disposed in the environment may be detected and locations of the one or more objects may be determined with respect to the vehicle and/or the environment. Accordingly, digital representations of the one or more objects may be presented on the display, and the digital representations of the objects may appear on the display at a position that corresponds to the object's actual location in the environment.

In some examples, an object in the environment may be detected based at least in part on the sensor data, and the method may include determining that the object is disposed outside of the first field-of-view. In other words, the method may include determining that the object, although detected in the environment, is not visibly displayed on the user interface because the object is within a second field-of-view that is outside of the first field-of-view shown on the user interface. The first field-of-view may, in some instances, be from a perspective above and behind the vehicle and include a portion of the environment in front of a direction of travel of the vehicle. Additionally, or alternatively, determining that the object is not visibly displayed on the user interface may be based at least in part on a user interface region obstructing the view of the object. For example, an interface, such as the system interface or the mission interface described above, may be presented on a region of the display and overlay the digital representation of the environment such that it obstructs the view of the object. In any such examples, the size of the field-of-view may be determined in order to maximize the ability of a user to detect issues/scenarios proximate the vehicle which may be relevant to resolution of an event/issue associated with the vehicle. In such examples, those objects outside of the field-of-view of the operator may still be relevant to operator action and, as such, provided as the additional indicators.

In some instances, a trajectory associated with the object may be determined based at least in part on the sensor data, and the method may include determining whether the trajectory intersects with the first field-of-view. As used herein, a "trajectory" of an object means a direction and one of acceleration or velocity of the object between a first waypoint and a second waypoint. If the trajectory does intersect with the first field-of-view such that the object may soon enter the first field-of-view, then the method may include causing presentation, on the user interface, of a visual indicator associated with the object. In some examples, causing presentation of the visual indicator may include causing presentation of the visual indicator such that the visual indicator is positioned at a location on the user interface that is proximate a predicted location where the object is predicted to intersect the first field-of-view. That is, the visual indicator may be positioned and displayed on the user interface proximate the location where the object is predicted to first appear on the user interface.

In some examples, the method may include determining and/or setting the first field-of-view. For instance, the first field-of-view may be determined or set based at least in part on receiving input data associated with setting the first field-of-view (e.g., receiving input from an operator to zoom-in or zoom-out the first field-of-view). Additionally, or alternatively, the first field-of-view may be determined or set based at least in part on one or more situational aspects associated with the vehicle and/or the environment, such as a number of objects in the environment, a location of the vehicle with respect to the environment, an event associated with the vehicle, a speed of the vehicle, a trajectory of the vehicle (e.g., whether the vehicle is turning or driving in a straight line), a classification of the environment at the location of the vehicle (e.g., whether the vehicle is operating in an urban, suburban, or rural area), etc. For instance, because the user interface is configured to present limited amounts of data to an operator so as not to overload the operator with information, the size of the field-of-view of the user interface may be actively set or determined to show more or less data to the operator based on situational aspects associated with the vehicle and/or the environment. For instance, if the vehicle is following a straight path on a highway the field-of-view may be set to a first size to display a first amount of data and if the vehicle is encountering an intersection the field-of-view may be set to a second size to display a second amount of data. In this way, the operator may be more intelligently informed as to the relevant information associated with the environment in which the vehicle is operating, without displaying too much information to the operator that may be irrelevant and/or distracting.

In some examples, whether the user interface causes presentation of a visual indicator associated with an off-screen object may additionally, or alternatively, be based at least in part on a predicted amount of time until the object enters the first field-of-view. For instance, based at least in part on the sensor data, a period of time associated with the object intersecting the first field-of-view may be determined, and if the period of time is less than or equal to a threshold period of time, the user interface may cause presentation of the visual indicator. In some examples, the threshold period of time may be a pre-configured amount of time, such as 1 second, 2 seconds, 3 seconds, 5 seconds, etc. Additionally, or alternatively, the threshold period of time may be dynamically determined based on one or more factors. For instance, the threshold period of time may be determined based on a speed of the vehicle. That is, in some examples, as the speed of the vehicle increases, the threshold period of time increases or decreases. Additionally, or alternatively, the threshold period of time may be determined based on a current location of the vehicle (e.g., city, highway, country, etc.), a time of day and/or week (e.g., whether the vehicle is operating during a rush-hour commute, on the weekend, etc.), environmental conditions in which the vehicle is operating (e.g., rain, snow, clear, etc.), and/or the like.

In some examples, whether the user interface causes presentation of a visual indicator associated with an off-screen object may additionally, or alternatively, be based at least in part on a determined speed associated with the object. For instance, based at least in part on the sensor data, a speed associated with the object may be determined, and if the speed of the object is greater than or equal to a threshold speed, the user interface may cause presentation of the visual indicator. In some examples, the threshold speed may be a pre-configured speed, such as 5 miles per hour (MPH), 10 MPH, 25 MPH, 35 MPH, etc. Additionally, or alternatively, the threshold speed may be dynamically determined based on the one or more factors described in the preceding paragraph with respect to the threshold period of time, and/or other factors. For instance, the threshold speed may be determined based on a speed of the vehicle, a current location of the vehicle, a time of day and/or week, a number of entities proximate the vehicle, environmental conditions in which the vehicle is operating, and/or the like.

In some instances, causing presentation of a visual indicator associated with an off-screen object may include causing presentation of a visual representation of a speed associated with the object, a proximity of the object to the first field-of-view, an object type associated with the object, and/or a period of time until the object enters the field-of-view. For instance, a size, shape, color, pattern (e.g., flashing, glowing, stiped, etc.), and/or textual labels of the visual indicator may be used to convey any or all of this information. By way of example, and not limitation, to indicate a period of time until the object enters the field-of-view, an amount of time may be presented proximate or within the visual indicator (e.g., by displaying a countdown timer or estimated amount of time, etc.), a size of the visual indicator may decrease as the period of time decreases, a color of the visual indicator may intensify or weaken as the period of time decreases, and/or the like.

In some examples, the method may include refraining from causing presentation of a visual indicator associated with an object that is disposed outside of the first field-of-view. For instance, based at least in part on the sensor data, an attribute associated with a detected object may be determined and, based at least in part on the attribute, the user interface may refrain from presenting a visual indicator that is associated with the object. In examples, the attribute may include one or more of a trajectory of the object, a speed of the object, a proximity of the object to the first field-of-view, an object type associated with the object, or a predicted time until the object intersects with the first field-of-view. By way of example and not limitation, the user interface may refrain from presenting the visual indicator if a trajectory of the object does not intersect with the first field-of-view. Additionally, or alternatively, based at least in part on the sensor data, a classification of a detected object may be determined and, based at least in part on the classification, the user interface may refrain from presenting a visual indicator that is associated with the object. In some examples, a classification of an object may include whether a car is parked or mobile, whether a pedestrian is stationary, walking, running, entering a crosswalk, etc., and the like.

In additional or alternative examples, an audible indication of an object may be output. That is, in addition to or alternatively from presenting the visual indicator of an off-screen object on the display, an audible indication (e.g., a tone, beep, chime, voice message, etc.) may be output by the display or an audio output device associated with the display.

These and other aspects are described further below with reference to the accompanying drawings. The drawings are merely example implementations and should not be construed to limit the scope of the claims. For example, while the example vehicles are shown and described as being autonomous vehicles that are capable of navigating between locations without human control or intervention, techniques described herein are also applicable to non-autonomous and/or semi-autonomous vehicles. Also, while the vehicle is illustrated as having a coach style body module with seats facing one another toward a center of the vehicle, other body modules are contemplated. Body modules configured to accommodate any number of one or more occupants (e.g., 1, 2, 3, 4, 5, 6, 7, 8, etc.) are contemplated. Additionally, while the example body modules shown include a passenger compartment, in other examples the body module may not have a passenger compartment (e.g., in the case of a cargo vehicle, delivery vehicle, construction vehicle, etc.).

Example Vehicle Monitoring Architecture

FIG. 1 illustrates a schematic diagram of an example environment 100 through which an example vehicle 102 travels. The example environment 100 includes a road network 104 including a plurality of example roads 106 having two pairs 108 of lanes 110 separated by a median or double-yellow line 112, with each of the lanes 110 of a pair 108 of lanes 110 defined by a lane dividing line 114 and lane boundary lines 116. The example road 106 also includes shoulders 118 located on opposite sides of the road 106. FIG. 1 also shows an example geographic location 120 associated with a departure location including a structure 122, such as a house or building, and an example destination 124 also including a structure 126, such as a house or building. The road network 104 provides a number of roads 106 defining a path between the geographic location 120 and the destination 124, and FIG. 1 shows an enlarged view of a portion of an example road 106. The road network 104 may include a number of features, such as curves, intersections with cross-roads, crosswalks, traffic signs, traffic lights, railroad crossings, traffic circles, directional arrows, etc.

As shown in FIG. 1, the example vehicle 102 may travel through the example environment 100 via the road network 104 according to a path from the geographic location 120 to the destination 124. For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to completion of the trip, including all parking functions, it may not include a driver. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 shown in FIG. 1 is an automobile having four wheels and respective tires for each of the wheels. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the example vehicle 102 has four wheels, the systems and methods described herein may be incorporated into vehicles having fewer or a greater number of wheels, tires, and/or tracks. The example vehicle 102 has four-wheel steering and may operate generally with equal performance characteristics in all directions, for example, such that a first end of the vehicle 102 is a front end of the vehicle 102 when travelling in a first direction 128, and such that the first end becomes the rear end of the vehicle 102 when traveling in the opposite, second direction 130, as shown in FIG. 1. Similarly, a second end of the vehicle 102 is a front end of the vehicle 102 when travelling in the second direction 130, and such that the second end becomes the rear end of the vehicle 102 when traveling in the opposite, first direction 128. Such a configuration may be referred to herein as "bidirectionality." These example bidirectional characteristics may facilitate greater maneuverability, for example, in small spaces or crowded environments, such as parking lots and urban areas.

In the example shown in FIG. 1, the vehicle 102 may use various sensors and a vehicle controller to autonomously operate through the environment 100 along the path via the road network 104. For example, the vehicle controller may be configured to determine a driving corridor 132 defined by virtual boundaries 134 within which the vehicle 102 may travel. For example, the driving corridor 132 may have a variable corridor width 136 in the width direction of the vehicle 102, and a variable corridor length 138 extending in the direction of travel of the vehicle 102. In some examples, the virtual boundaries 134 of the driving corridor 132 may be determined based at least in part on sensor data received from sensors associated with the vehicle 102 and/or road network data received by the vehicle 102 via a road network data store, as explained in more detail herein. Though not illustrated in FIG. 1, such sensor data indicative of objects may be represented in such a corridor as indented or removed portions. In some examples, the vehicle 102 may travel along a drive line 140 within the driving corridor 132.

Also shown in FIG. 1 are two example interior views 142A and 142B of the vehicle 102 in which an operator 144 of the vehicle 102 is interacting with a user interface that is associated with the vehicle 102. Of course, though depicted for illustrative purposes as being within the vehicle, such an operator may be, alternatively, located remotely therefrom. The user interface may be configured to provide the operator 144 with data related to the vehicle 102, control of one or more systems or components of the vehicle, control of selecting routes that the vehicle is to navigate, diagnostic information associated with the vehicle, etc. In the first example interior view 142A, the operator 144 is interacting with the user interface using a laptop computer 146. Although shown as a laptop computer 146 for illustration purposes, it is contemplated that the operator 144 may be able to interact with the user interface using another type of personal electronic device, such as a smartphone or a tablet.

In the second example interior view 142B, the operator 144 is interacting with the user interface using a display 148 of the vehicle 102. In some instances, the display 148 of the vehicle 102 may comprise a touch display and the operator 144 may interact with the user interface using one or more touch inputs. Additionally, or alternatively, the operator 144 may use an input device to interact with the user interface presented on the display 148. In examples, the input device may include one or more of a touch-sensitive screen, a stylus, a mouse, a dial, a keypad, and/or a gesture-input system configured to translate gestures performed by the operator 144 into input commands for the user interface. In these and other ways, the interfaces described herein may receive input via touch input, gesture input via hand tracking, an input device (e.g., mouse, keyboard, stylus, track ball, track pad, etc.), voice recognition inputs, or any other form of user input. Also, the interfaces may be configured to include input from one or multiple users simultaneously.

In some examples, in order to provide the operator 144 with information and/or data associated with the vehicle 102, the user interface may present a digital representation of an environment in which the vehicle 102 is operating, such as the environment 100. For instance, the digital representation of the environment 100 may include, in some examples, digital representations of the vehicle 102, the road network 104, including the roads 106, lanes 110, median or double-yellow line 112, dividing line 114, and lane boundary lines 116. Additionally, the digital representation of the environment 100 may also include digital representations of structures, such as structures 122 and 126, other vehicles, pedestrians, motorists, traffic lights and/or traffic signage, and the like. Additionally, in some instances, the user interface may present notifications of objects (e.g., other vehicles, pedestrians, etc.) that are disposed outside of a field-of-view shown on the laptop computer 146 and/or the display 148 but that will eventually enter the field-of-view.

In some examples, the user interface may be presented to persons who are not occupants of the vehicle 102, such as operator 144. For instance, the user interface may be presented to a remote teleoperator who is monitoring a fleet of vehicles and receiving data associated with respective vehicles of the fleet of vehicles over one or more communication networks.

Figure 2:
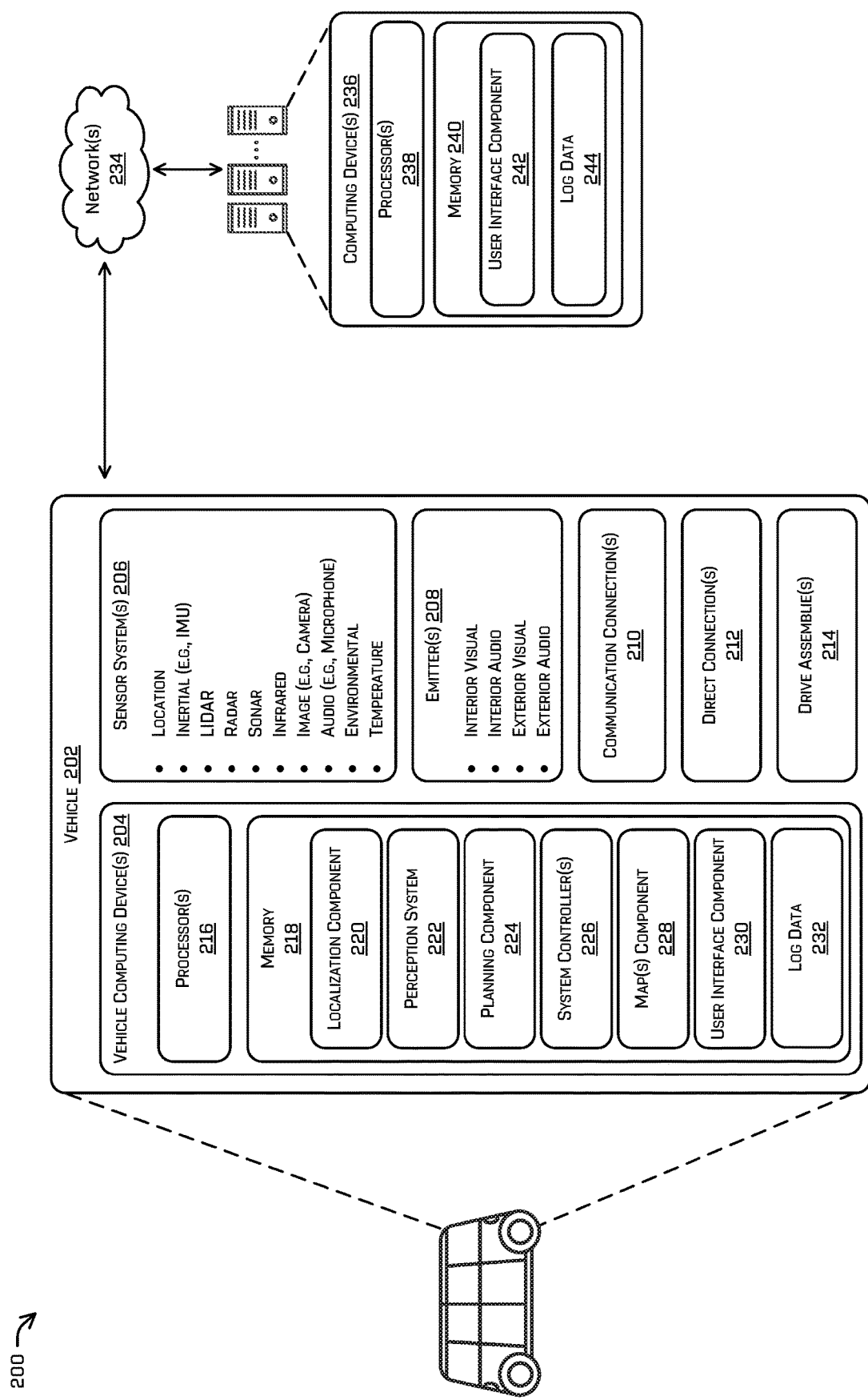
FIG. 2 is a block diagram illustrating an example system for implementing some of the various technologies described herein.

FIG. 2 is a block diagram illustrating an example system 200 for implementing some of the various technologies described herein. In some examples, the system 200 may include one or multiple features, components, and/or functionality of examples described herein with reference to other figures, such as FIGS. 1, 3, 4A, 4B, etc.

The system 200 may include a vehicle 202. In some examples, the vehicle 202 may include some or all of the features, components, and/or functionality described above with respect to vehicle 102. For instance, the vehicle 202 may comprise a bidirectional vehicle. As shown in FIG. 2, the vehicle 202 may also include a vehicle computing device 204, one or more sensor systems 206, one or more emitters 208, one or more communication connections 210, one or more direct connections 212, and/or one or more drive assemblies 214.

The vehicle computing device 204 can, in some examples, include one or more processors 216 and memory 218 communicatively coupled with the one or more processors 216. In the illustrated example, the vehicle 202 is an autonomous vehicle; however, the vehicle 202 could be any other type of vehicle (e.g., automobile, truck, bus, aircraft, watercraft, train, etc.), or any other system having components such as those illustrated in FIG. 3 (e.g., a robotic system, an automated assembly/manufacturing system, etc.). In examples, the one or more processors 216 may execute instructions stored in the memory 218 to perform one or more operations on behalf of the one or more vehicle computing devices 204.

The memory 218 of the one or more vehicle computing devices 204 stores a localization component 220, a perception system 222, a planning component 224, one or more system controllers 226, a map(s) component 228, a user interface component 230, and log data 232. Though depicted in FIG. 2 as residing in memory 218 for illustrative purposes, it is contemplated that the localization component 220, perception system 222, planning component 224, one or more system controllers 226, map(s) component 228, user interface component 230, and/or the log data 232 can additionally, or alternatively, be accessible to the vehicle 202 (e.g., stored on, or otherwise accessible from, memory remote from the vehicle 202, such as memory 240 of one or more computing devices 236).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 206 or received from one or more other devices (e.g., computing devices 236) to accurately determine a location of the autonomous vehicle. In some instances, the localization component 220 can provide data to various components of the vehicle 202 to determine an initial position of the autonomous vehicle for generating a trajectory and/or for determining to retrieve map data. In various examples, the localization component 220 can provide data to the user interface component 230, and the user interface component 230 may cause presentation, on a display (e.g., laptop computer 146 or vehicle display 148), of a position of the vehicle 202 with respect to an environment in which the vehicle 202 is operating.

In some instances, the perception system 222 can include functionality to perform object tracking, detection, segmentation, and/or classification. In some examples, the perception system 222 can provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional and/or alternative examples, the perception system 222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception system 222 may provide data to the user interface component 230, and the user interface component 230 may cause presentation, on a display (e.g., laptop computer 146 or vehicle display 148), of a digital representation of one or more objects that are disposed in the environment in which the vehicle is operating.

In general, the planning component 224 can determine a path for the vehicle 202 to follow to traverse through an environment. For example, the planning component 224 can determine various routes and trajectories and various levels of detail. For example, the planning component 224 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 224 can generate an instruction for guiding the autonomous vehicle along at least a portion of the route from the first location to the second location. In at least one example, the planning component 224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate. In some examples, the planning component 224 may communicate with the user interface component 230 in order to send and/or receive selections of routes that the vehicle 202 is to navigate.

In at least one example, the vehicle computing device 204 can include one or more system controllers 226, which can be configured to control steering, propulsion, braking, safety, emitters, communication, components, and other systems of the vehicle 202. These system controller(s) 226 can communicate with and/or control corresponding systems of the drive assembly(s) 214 and/or other components of the vehicle 202.

The memory 218 can further include the map(s) component 228 to maintain and/or update one or more maps (not shown) that can be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 202 can be controlled based at least in part on the maps. That is, the maps can be used in connection with the localization component 220, the perception system 222, and/or the planning component 224 to determine a location of the vehicle 202, identify objects in an environment, and/or generate routes and/or trajectories to navigate within an environment. Additionally, the maps can be used in connection with the user interface component 230, such as in a mission interface of the user interface as described herein, to present a map interface.

In some examples, the one or more maps can be stored on a remote computing device(s) (such as the computing device(s) 236) accessible via network(s) 234. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 218 may also store a user interface component 230. The user interface component 230 may generate a user interface that is associated with the vehicle 202. In some instances, the user interface may be presented on a display that is associated with the vehicle 202 (e.g., affixed to the interior of the vehicle, in communication with the vehicle over, for instance, a Bluetooth or other short range communication network, etc.) such that occupants of the vehicle may view the user interface. Additionally, or alternatively, the user interface may be presented on a display of a laptop computer that is associated with the vehicle 202. The user interface component 230 may receive data from the various components and/or sensors of the vehicle 202 and use that data to generate a digital representation of the vehicle 202 as it traverses an environment. For instance, the user interface component 230 may receive data from the perception system 222 and/or raw data from the various sensor systems 206 and use that data to generate a digital representation of other vehicles, pedestrians, cyclists, structures, and the like that are disposed in the environment.

The memory 218 may also store log data 232 associated with the vehicle. For instance, the log data 232 may include one or more of diagnostic messages, notes, routes, etc. associated with the vehicle. By way of example, if information associated with a notification (e.g., diagnostic message) that is presented on a system interface of the user interface is copied and saved, the information may be stored in the log data 232.

In some instances, aspects of some or all of the memory-stored components discussed herein can include any models, algorithms, and/or machine learning algorithms. For example, in some instances, components in the memory 218 (and the memory 240, discussed in further detail below) such as the perception system 222, planning component 224, and/or user interface component 230 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 206 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 206 can include multiple instances of each of these or other types of sensors. For instance, the lidar sensors can include individual lidar sensors located at the corners, front, back, sides, and/or top of the vehicle 202. As another example, the image sensors can include multiple image sensors disposed at various locations about the exterior and/or interior of the vehicle 202. As an even further example, the audio sensors can include multiple audio sensors disposed at various locations about the exterior and/or interior of the vehicle 202. Additionally, the audio sensors can include an array of a plurality of audio sensors for determining directionality of audio data. The sensor system(s) 206 can provide input to the vehicle computing device 204. Additionally, or alternatively, the sensor system(s) 206 can send sensor data, via the one or more networks 234, to the one or more computing device(s) 236 at a particular frequency, after a lapse of a predetermined period of time, in near real-time, etc.

The vehicle 202 can also include one or more emitters 208 for emitting light and/or sound. The emitters 208 in this example include interior audio and visual emitters to communicate with passengers of the vehicle 202. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive assembly(s) 214. Also, the communication connection(s) 210 can allow the vehicle 202 to communicate with other nearby computing device(s) (e.g., other nearby vehicles, traffic signals, laptop computer 146, etc.). The communications connection(s) 210 also enable the vehicle 202 to communicate with a remote teleoperations system or other remote services.

The communications connection(s) 210 can include physical and/or logical interfaces for connecting the vehicle computing device(s) 204 to another computing device (e.g., computing device(s) 236) and/or a network, such as network(s) 234. For example, the communications connection(s) 210 can enable Wi-Fi-based communication such as via frequencies defined by the IEEE 702.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 212 of vehicle 202 can provide a physical interface to couple the one or more drive assembly(s) 214 with the body of the vehicle 202. For example, the direct connection 212 can allow the transfer of energy, fluids, air, data, etc. between the drive assembly(s) 214 and the vehicle 202. In some instances, the direct connection 212 can further releasably secure the drive assembly(s) 214 to the body of the vehicle 202.

In at least one example, the vehicle 202 can include one or more drive assemblies 214. In some examples, the vehicle 202 can have a single drive assembly 214. In at least one example, if the vehicle 202 has multiple drive assemblies 214, individual drive assemblies 214 can be positioned on opposite longitudinal ends of the vehicle 202 (e.g., the leading and trailing ends, the front and the rear, etc.).

The drive assembly(s) 214 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 214 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive assembly(s) 214. Furthermore, the drive assembly(s) 214 may also include one or more communication connection(s) that enable communication by the respective drive assembly with one or more other local or remote computing device(s).

The computing device(s) 236 can include one or more processors 238 and memory 240 that may be communicatively coupled to the one or more processors 238. The memory 240 may store a user interface component 242 and log data 244. In some examples, the computing device(s) 236 may be associated with a teleoperations system. Additionally, or alternatively, the computing devices(s) 236 may be leveraged by the teleoperations system to receive and/or process data on behalf of the teleoperations system.

The user interface component 242 may generate a user interface that is associated with the vehicle 202. The user interface may be presented to a device associated with a teleoperator such that the teleoperator may remotely monitor the vehicle 202. For instance, while the vehicle 202 may be operating in a first geographic location (e.g., San Jose), the remote teleoperator may be monitoring the vehicle 202 from a second geographic location (e.g., Los Angeles). The user interface component 242 may receive data over the network 234 from the various components and/or sensors of the vehicle 202 and use that data to generate a digital representation of the vehicle 202 as it traverses an environment. For instance, the user interface component 242 may receive data from the perception system 222 and/or raw data from the various sensor systems 206 and use that data to generate a digital representation of other vehicles, pedestrians, cyclists, structures, and the like that are disposed in the environment.

In some examples, the memory 240 may include log data 244. The log data 244 may store one or more notes created using the user interface. For instance, if an anomaly is present in the vehicle 202, a user may desire to take note of the anomaly for future reference and/or diagnostics. Accordingly, the log data 244 may store such notes.

The processor(s) 216 of the vehicle 202 and the processor(s) 238 of the computing device(s) 236 can be any suitable processor capable of executing instructions to process data and perform operations as described herein. By way of example and not limitation, the processor(s) 216 and 238 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 240 are examples of non-transitory computer-readable media. The memory 218 and 240 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Figure 3:
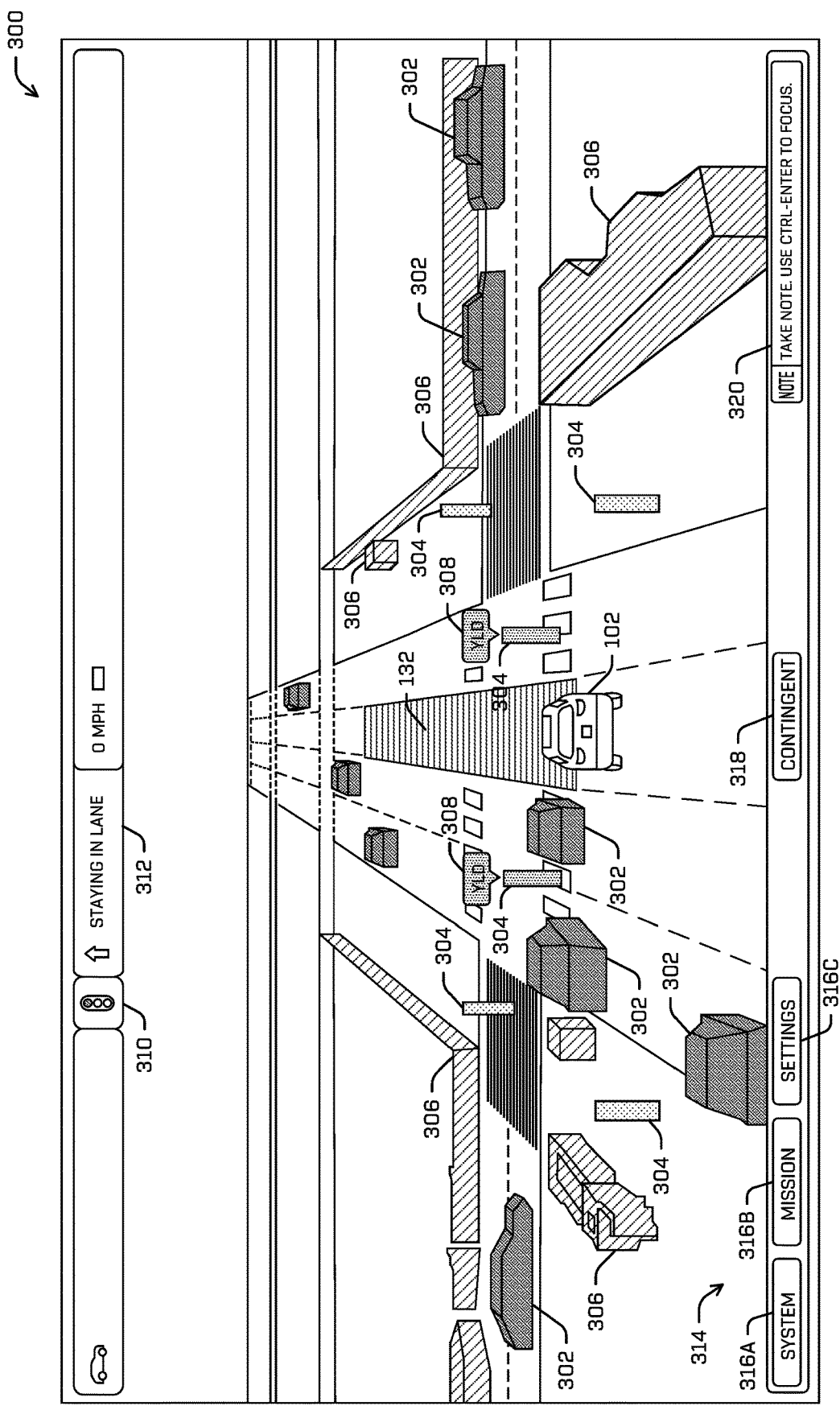
FIG. 3 illustrates an example user interface for monitoring a vehicle as it traverses an environment.

As can be understood, the components discussed herein are described as divided for illustrative purposes. However, the operations performed by the various components can be combined or performed in any other component. It should be noted that while FIG. 3 is illustrated as a distributed system, in alternative examples, components of the vehicle 202 can be associated with the computing device(s) 236 and/or components of the computing device(s) 236 can be associated with the vehicle 202. That is, the vehicle 202 can perform one or more of the functions associated with the computing device(s) 236, and vice versa.

Example User Interface Technologies

FIG. 3 illustrates an example user interface (UI) 300 for monitoring a vehicle 102 as it traverses an environment. In some examples, the user interface 300 may be presented on a display, such as a display of a laptop computer 146 or a display 148 of the vehicle 102. As shown, the user interface 300 may include a digital representation of the vehicle 102 as it traverses the environment, as well as, in some instances, a driving corridor 132 that is associated with a trajectory of the vehicle 102.

In some examples, the user interface 300 may include digital representations of objects that are disposed within the environment. Each of the objects may represent different types of agents, such as vehicle agents 302, bicyclist agents, pedestrian agents 304, and structure/building agents 306. For instance, if a detected type of object is another vehicle that is within the environment, the user interface 300 may represent the object as a vehicle agent 302. Similarly, if the detected type of object is a bicyclist or a pedestrian, the user interface 300 may represent the object as a bicyclist agent or pedestrian agent 304, respectively.

In some examples, different objects may comprise different shapes, sizes, colors, etc. depending on the type of agent. For instance, vehicle agents 302 may be represented by a first color (e.g., blue), bicyclist agents may be represented by a second color (e.g., purple), pedestrian agents 304 may be represented by a third color (e.g., orange), and structure/building agents 306 may be represented by a third color (e.g., gray). As another example, a sedan may be represented by a first vehicle agent 302 that is a first size and/or shape associated with the sedan body style, a sport utility vehicle (SUV) may be represented by a second vehicle agent 302 that is a second size and/or shape associated with the SUV body style, a pickup truck may be represented by a third vehicle agent 302 that is a third size and/or shape associated with the pickup tuck body style, and a semi-trailer truck may be represented by a fourth vehicle agent 302 that is a fourth size and/or shape associated with the semi-trailer truck body style. Further, although illustrated in FIG. 4 as three-dimensional (3D) rectangular blocks, 3D trapezoidal blocks, and 3D cylinders for simplicity, it is to be understood that other shapes and/or designs are contemplated for representing the various agents. For instance, if a detected object comprises a sedan-type vehicle, then the vehicle agent 302 representing the object may be in the shape of a sedan-type vehicle.

In some examples, a digital representation of an agent may be modified based at least in part on a classification or attribute associated with the agent. By way of example, and not limitation, pedestrian agents 304 may comprise a first color (e.g., orange) in most instances, but if a pedestrian agent 304 enters a cross-walk and the vehicle 102 must yield to the pedestrian agent 304, then the pedestrian agent 304 may comprise a second color (e.g., yellow). Additionally, or alternatively, the digital representation of a pedestrian agent 304 that the vehicle 102 must yield to may also comprise a flag 308, as shown, to further indicate that the vehicle 102 is to yield to the pedestrian agent 304. Similarly, in some examples, a digital representation of a vehicle agent 302 may change if the vehicle agent 302 is determined to be parked, moving, stopped, and the like. It is to be understood that any of the agents described in this disclosure may include functionality to change appearance based at least in part on a classification or attribute associated with the agent.

In some examples, the user interface 300 may include a traffic rule interface 310 and a vehicle action interface 312. The traffic rule interface 310 may provide information associated with one or more traffic rules that the vehicle 102 is subject to at a given point in time. For example, as shown in FIG. 1, the vehicle 102 is currently stopped at a red light, and the traffic rule interface 310 indicates that the traffic light of the intersection the vehicle 102 is approaching is red. The vehicle action interface 312 may provide information associated with a current and/or predicted trajectory of the vehicle 312. For instance, the vehicle action interface 312 may indicate, among other things, that the vehicle 102 is staying in a current lane, changing lanes, turning a certain direction (e.g., left or right), backing up, coming to a stop, etc. Additionally, the vehicle action interface 312 may indicate a current speed of the vehicle 102, a current state of vehicle 102 signals (e.g., turn signals, brake lights, etc.), a current steering wheel position, and the like.

The user interface 300 may also include multiple interface selection elements 314. The interface selection elements 314, when selected, may cause one or more additional interfaces associated with the vehicle to be presented on the user interface. For instance, a system interface selection input 316A may cause a system interface, as described herein, to be presented on the user interface. Likewise, the mission interface selection input 316B may cause a mission interface to be presented on the user interface, and the settings interface selection input 316C may cause a settings interface to be presented. The settings interface may be configured to allow a user to change settings associated with the vehicle (e.g., a drive mode of the vehicle, whether the vehicle is to operate autonomously, semi-autonomously, etc.), settings associated with the user interface (e.g., the system interface, mission interface, note-taking interface, etc.), and the like. In some examples, selecting an individual one of the interface selection elements 314 may cause the respective interface to be presented on the user interface and cause another interface to be suppressed. For instance, if the system interface selection input 316A had been previously selected such that the system interface was being displayed on the user interface, and subsequently the mission interface selection input 316B is selected, then the mission interface may be presented on the user interface and the system interface may be suppressed.

In some instances, the user interface 300 may include a "Contingent" input element 318. The contingent input element 318 may, when selected, cause the vehicle 102 to stop following a trajectory and perform a safe, but immediate, stopping maneuver. Additionally, or alternatively, the vehicle 102 may cease from navigating a planned trajectory when the contingent input element 318 is selected and, instead, maintain navigating a current trajectory. Additionally, in some examples the user interface 300 may include a note taking interface 320 that provides the user interface 300 with the capability of taking notes. For instance, diagnostic messages and/or error codes associated with the vehicle 102 may be saved for later review using the note taking interface 320. The note taking interface 320 may include a text-field input element where a user can type or otherwise enter text data representing notes and/or messages that are to be saved.

FIGS. 4A-4D illustrate various example views of an example system interface 404 of a user interface 400 for monitoring a vehicle. In some examples, the user interface 400 may include a digital representation of an environment in which a vehicle 102 is operating. Additionally, when the system interface selection input 316A of the user interface 400 is selected, as show, then the system interface 404 may be displayed on the user interface 400.

In some examples, the digital representation of the environment 402 may include a digital representation of the vehicle 102, a driving corridor 132 that is associated with a trajectory of the vehicle 102, and one or more predicted checkpoints 406A-406C. In some examples, a predicted checkpoint may indicate a location in the environment in which the vehicle 102 will be positioned at a certain point in time. By way of example, and not limitation, the predicted checkpoint 406A may indicate a location where the vehicle 102 will be in 5 seconds, the predicted checkpoint 406B may indicate a location where the vehicle 102 will be in 10 seconds, and the predicted checkpoint 406C may indicate a location where the vehicle 102 will be in 15 seconds.

In some examples, the system interface 404 may include one or more interactive input and/or output elements, such as the multiple control inputs 408 and the multiple notifications 410. The multiple control inputs 408 may be configured to control one or more systems or components of the vehicle 102. For instance, each of the control inputs 408, when selected, may activate or deactivate a system or component of the vehicle. For instance, the "RADAR" control input may activate or deactivate a RADAR system of the vehicle 102 by, for example, activating or deactivating a software component (e.g., node) for capturing, receiving, and/or processing sensor data of the RADAR system of the vehicle 102. Similarly, the "CAMERAS" control input may activate or deactivate a camera system or component of the vehicle.

Figure 4A:
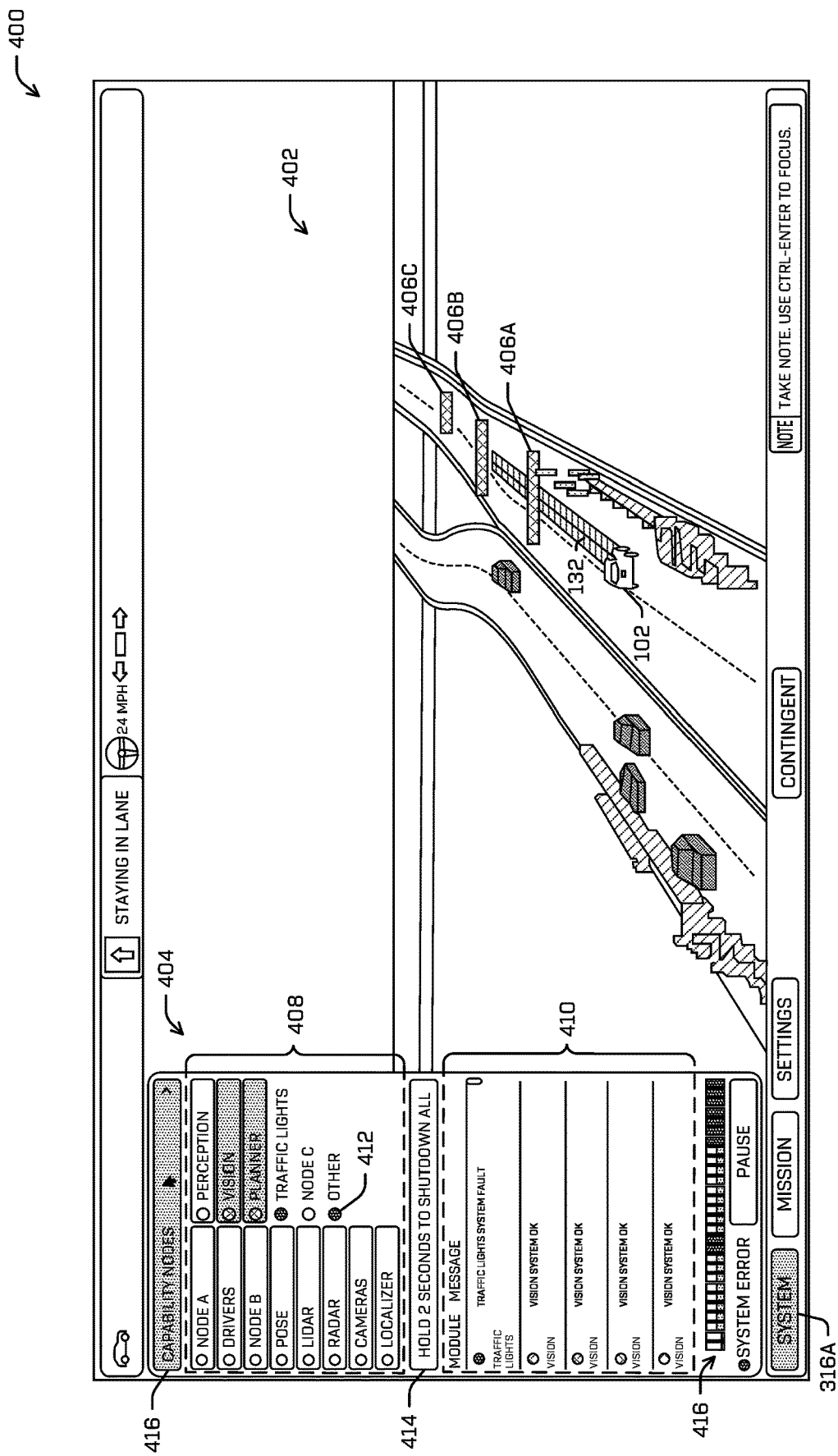
FIGS. 4A-4D illustrate various example views of an example system interface of a user interface for monitoring a vehicle.

In some examples, an appearance of respective ones of the control inputs 408 may change when selected, such as the "VISION" and "PLANNER" control inputs 408 shown in FIG. 4A, by, for instance, changing color, changing shade, changing shape, and the like. In some examples, some or all of the control inputs 408 may not be selectable, such as the "TRAFFIC LIGHTS," "NODE C," and "OTHER" control inputs 408. In this way, a person who is using the user interface 400 may not be able to activate or deactivate certain control inputs 408 for safety reasons, for instance. In some examples, each of the control inputs 408 may include a status indicator, such as status indicator 412 of the OTHER control input. A status indicator may visually indicate a status associated with the system or component of the vehicle 102 that a control input is associated with. For example, a green colored status indicator may indicate that the system or component is in a normal state, a black colored status indicator may indicate that the system or component is in turned off and/or turned on but not transmitting data, an orange colored status indicator may indicate that the system or component is in a warning state, a red colored status indicator may indicate that the system or component is in an error state, and a pink colored status indicator may indicate that the system or component is in a stale state.

In various examples, the system interface 404 may include a shutdown input 414 to deactivate all of the control inputs 408 at once, instead of a user having to individually select each one of the activated control inputs 408 in order to shut down the vehicle 102. In some examples, a person using the user interface 400 may have to select the shutdown input 414 and hold the shutdown input 414 selected for a threshold period of time before the shutdown input 414 will deactivate all of the control inputs 408. For instance, as shown in FIG. 4A, the shutdown input 414 must be held for a minimum of 2 seconds before the control inputs 408 will be deactivated.

As noted above, the system interface 404 may include multiple notifications 410. The multiple notifications 410 may provide information associated with the systems or components of the vehicle 102. For instance, a notification of the multiple notifications 410 may include a diagnostic message associated with one of the systems or components of the vehicle 102, such as whether the system or component is in a normal state, turned off and/or turned on but not transmitting data, a warning state, an error state, a stale state, and/or the like. In this way, in some examples the notifications 410 may provide additional detail associated with a status indicator of a control input 408, such as status indicator 412. It should be understood that the multiple notifications 410, although shown in FIGS. 4A-4D as being presented on the left side of the user interface 400 within the system interface 404, it is contemplated that the multiple notifications 410 may be presented at different locations of the user interface 400. Additionally, or alternatively, individual ones of the multiple notifications 410 may be presented at different locations of the user interface 400 based on a severity of the individual notification. For instance, a notification that is more severe and/or pertinent may be displayed in another location of the user interface 400 to draw an operator's attention to it.

In some examples, the system interface 404 may include a notification timeline 416 that is configured to visually represent the notifications 410 over time. The notification timeline 416 may indicate when a first notification of the notifications 410 was received with respect to a second notification of the notifications 410, as well as a severity of the notification. That is, the notification timeline 416 may indicate whether a system or component is in a normal state, turned off and/or turned on but not transmitting data, a warning state, an error state, a stale state, and/or the like. In some examples, a notification may be represented on the notification timeline 412 as a vertical rectangle, as shown in FIG. 4A, and an amount of shading, color, shape, or other feature of a vertical rectangle may indicate the severity of a notification. By way of example, and not limitation, a rectangle with minimal to no shading may indicate that a system or component is in a normal state, slightly more shading (e.g., ¼ full) may indicate that a system or component is turned off and/or turned on but not transmitting data, a vertical rectangle that is half-way shaded may indicate a warning state, a fully shaded and red rectangle may indicate an error state, and a fully shaded and pink rectangle may indicate a stale state. This is just one example of how color, fill, shading, etc. may be used in the notification timeline 412 to indicate severity of notifications 410, and other schemes may be used.

The system interface 404, in some instances, may include a hide-menu input 416 that is configured to hide the control inputs 408 from being presented on the user interface 400. In this way, when the hide-menu input 416 is selected, the system interface 404 may hide or refrain from presenting the control inputs 408 such that additional notifications 410 may be presented, as shown in FIG. 4B.

Figure 4B:
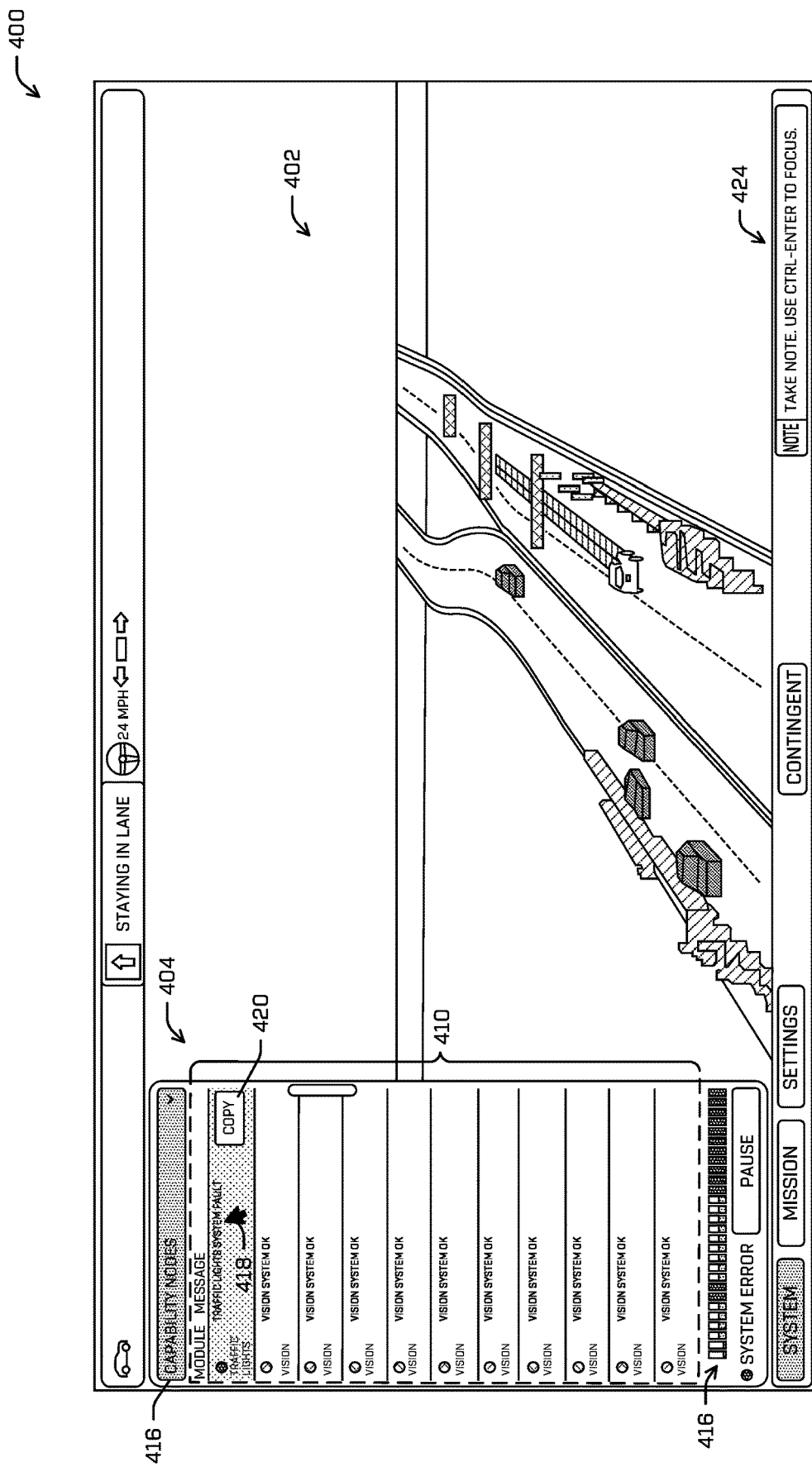

FIG. 4B illustrates the example user interface 400 including an example view of the system interface 404 when the hide-menu input 416 has been selected and additional notifications 410 are displayed. FIG. 4B also illustrates an example of when a mouse cursor 418 is proximate to a notification of the multiple notifications 410, a copy input element 420 may be displayed within the notification. In some instances, the copy input element 420, when displayed in this manner, may be configured to copy some or all of the information associated with the notification. For instance, the text data shown in FIG. 4B within the "TRAFFIC LIGHTS" notification may be copied to a clipboard, a note-taking interface 424, a memory associated with the vehicle, and/or a data log associated with the vehicle when the copy input element 420 is selected. Additionally, or alternatively, the copy input element 420, when displayed in this manner, may be configured to copy other information associated with the notification that is not displayed on the user interface, such as timestamp data, a severity of the notification, data from the component or system, and the like. In this way, an operator may quickly and accurately record data associated with an error into, for instance, a data log associated with the vehicle.

Figure 4C:
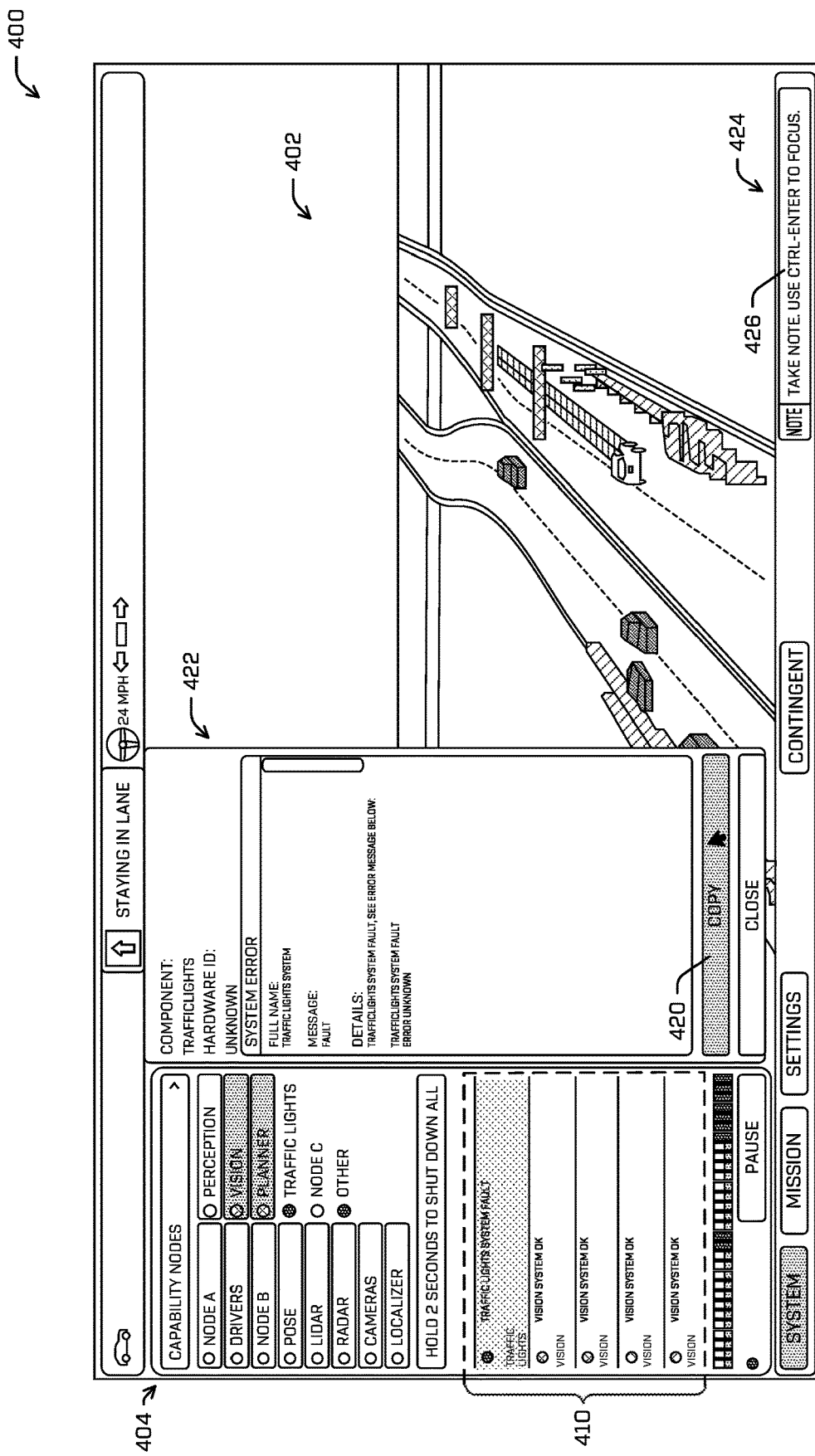

FIG. 4C illustrates the example user interface 400 including an example view of the system interface 404 when an individual notification of the multiple notifications 410 has been selected. As shown in FIG. 4C, the "TRAFFIC LIGHTS" notification has been selected and additional information 422 has been displayed on the user interface 420. The additional information 422 may include text data that represents a diagnostic message associated with one of the systems or components of the vehicle. Additionally, the additional information 422 may include a component name, hardware identification, name, message, timestamp, and/or other details associated with the notification. As shown, the copy input element 420 may be displayed on the user interface 400 proximate the additional information. In some examples, when the copy input element 420 is displayed in this manner, the copy input element 420 may be configured to copy all of the additional information 422, some of the additional information 422, a selection of the additional information 422, and/or the like. For instance, the mouse cursor may be used to click and drag to select a portion of the text data of the additional information 422 that is to be copied. In any one of these ways, the text data of the additional information 422 may be copied to a clipboard such that the text data may be pasted into a text field input 426 of a note interface 424 to be saved for later review. Additionally, or alternatively, any data associated with the individual notification may be copied directly to the note-taking interface 424, a memory associated with the vehicle, and/or a data log associated with the vehicle when the copy input element 420 is selected.

Figure 4D:
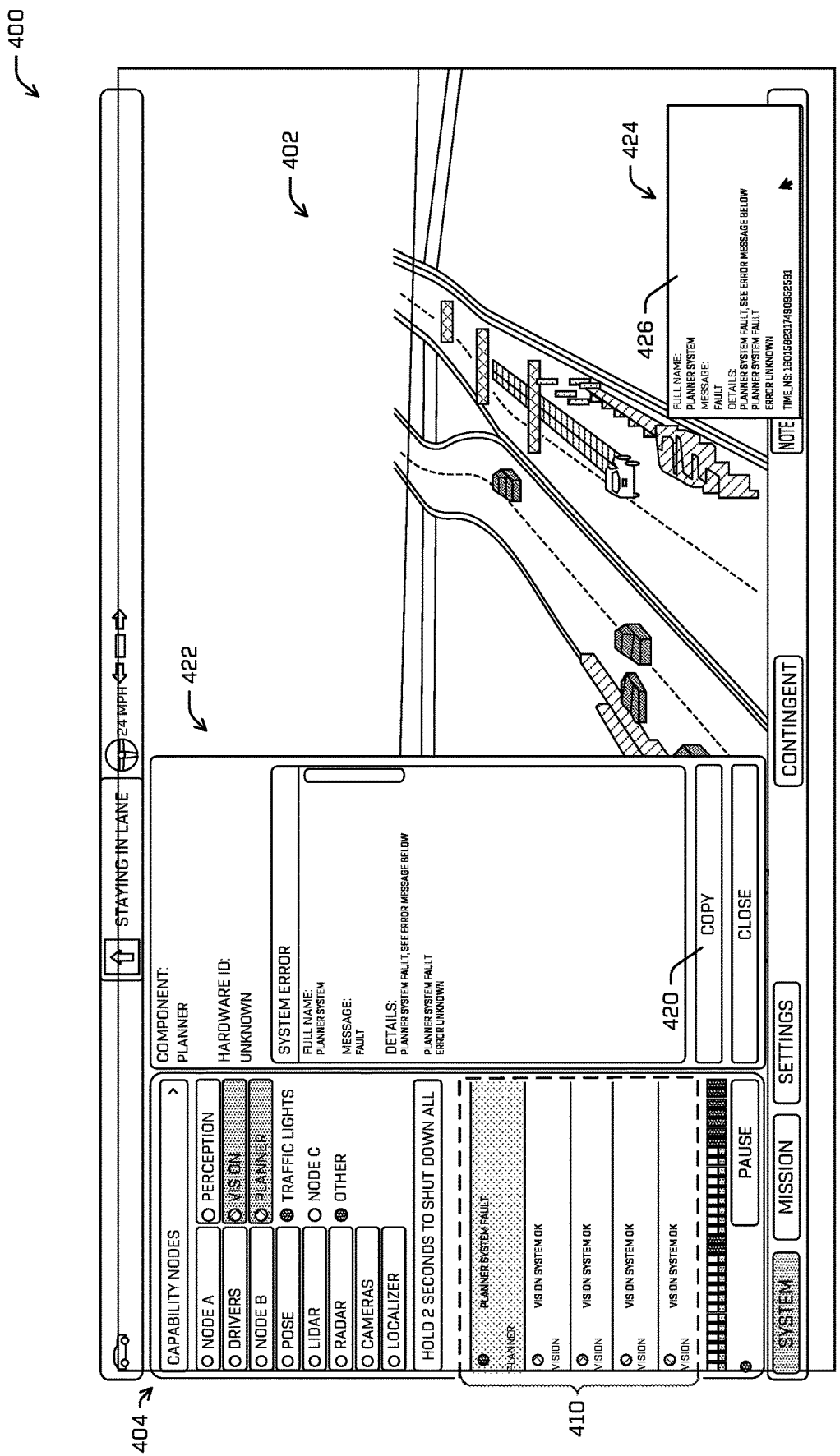

FIG. 4D illustrates the example user interface 400 including an example view of the system interface 404 when an individual notification of the multiple notifications 410 has been selected, as well as when a portion of information of the additional information 422 has been copied and pasted into a text field input 426 of the note interface 424. For instance, the text data shown within the text field input 426 in FIG. 4D may have been copied by selecting the copy input element 420 that is displayed proximate the additional information. To paste the text data into the text field input 426, a person using the user interface 400 may, in some examples, right click with the cursor on the text field input 426, left click with the cursor on the text field input 426 and press the "Ctrl" and "v" keys of a keyboard simultaneously, audibly communicate a voice command to cause the text data to be pasted, and the like. Additionally, or alternatively, the copy input element 20 may be configured to directly copy and paste the text data or any other data associated with the individual notification when the copy input element 420 is selected.

Figures 5A, 5B:
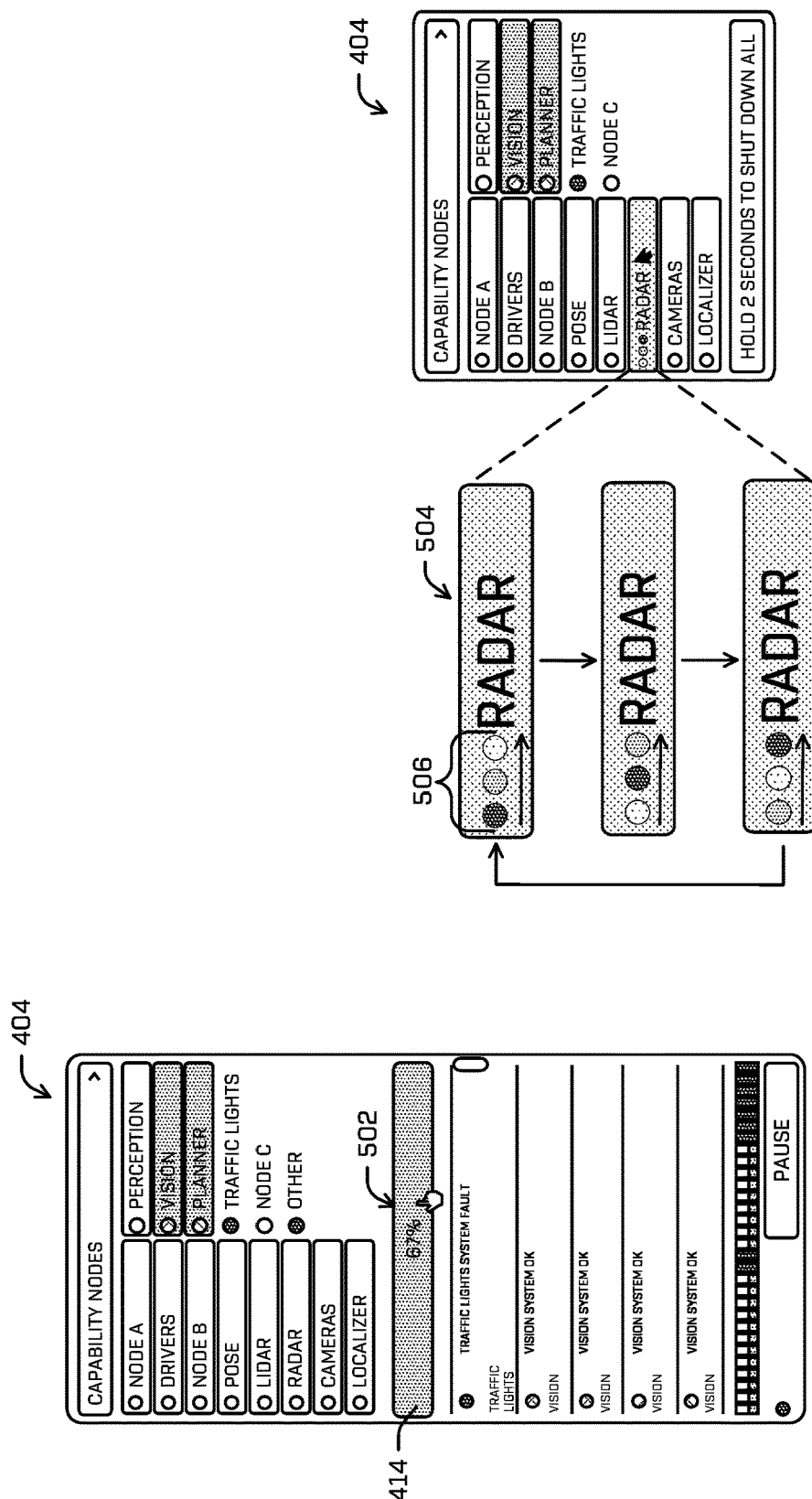
FIGS. 5A and 5B illustrate example functionality of an example system interface of a user interface.

FIGS. 5A and 5B illustrate example functionality of an example system interface 404 of a user interface. In FIG. 5A, additional detail is shown with respect to the functionality of the shutdown input 414. For instance, when the shutdown input 414 is selected, as shown, an appearance 502 of the shutdown input 414 may change to show a percentage amount associated with how long the shutdown input 414 has been pressed with respect to the threshold amount of time required to activate the shutdown input 414. Additionally, or alternatively, the shutdown input 414 may show an amount of time remaining that the shutdown input 414 must be pressed to deactivate the systems or components of the vehicle. In some instances, the appearance 502 of the shutdown input 414 may, additionally or alternatively, change color, contrast, shape, fill, transparency, and/or the like to indicate whether the threshold period of time to activate the shutdown input 414 has been met.

FIG. 5B illustrates example functionality of a control input of the system interface when a specific control input is selected to activate a component or system of the vehicle. In some examples, when a control input is selected, such as the RADAR control input 504 shown in FIG. 5B, a visual appearance of the control input 504 may change to indicate that the system or component of the vehicle is activating or deactivating. For instance, if the RADAR control input 504 is selected to cause a RADAR system of the vehicle to activate or deactivate, startup/shutdown indicators 506 may be presented within the control input 504 to indicate whether the system or component is being activated or deactivated. For instance, if a control input 504 is selected to cause a system or component to activate, the startup/shutdown indicators 506 may continuously strobe or blink while the component or system is activating such that the startup/shutdown indicators 506 appear to be moving to the right, as shown. Conversely, if a control input 504 is selected to cause a system or component to deactivate, the startup/shutdown indicators 506 may continuously strobe or blink while the component or system is deactivating such that the startup/shutdown indicators 506 appear to be moving to the left, opposite to what is shown in FIG. 5B. In this way, the startup/shutdown indicators 506 may provide visual feedback to an operator to indicate whether a system or component of the vehicle is being activated or deactivated.

Figure 6:
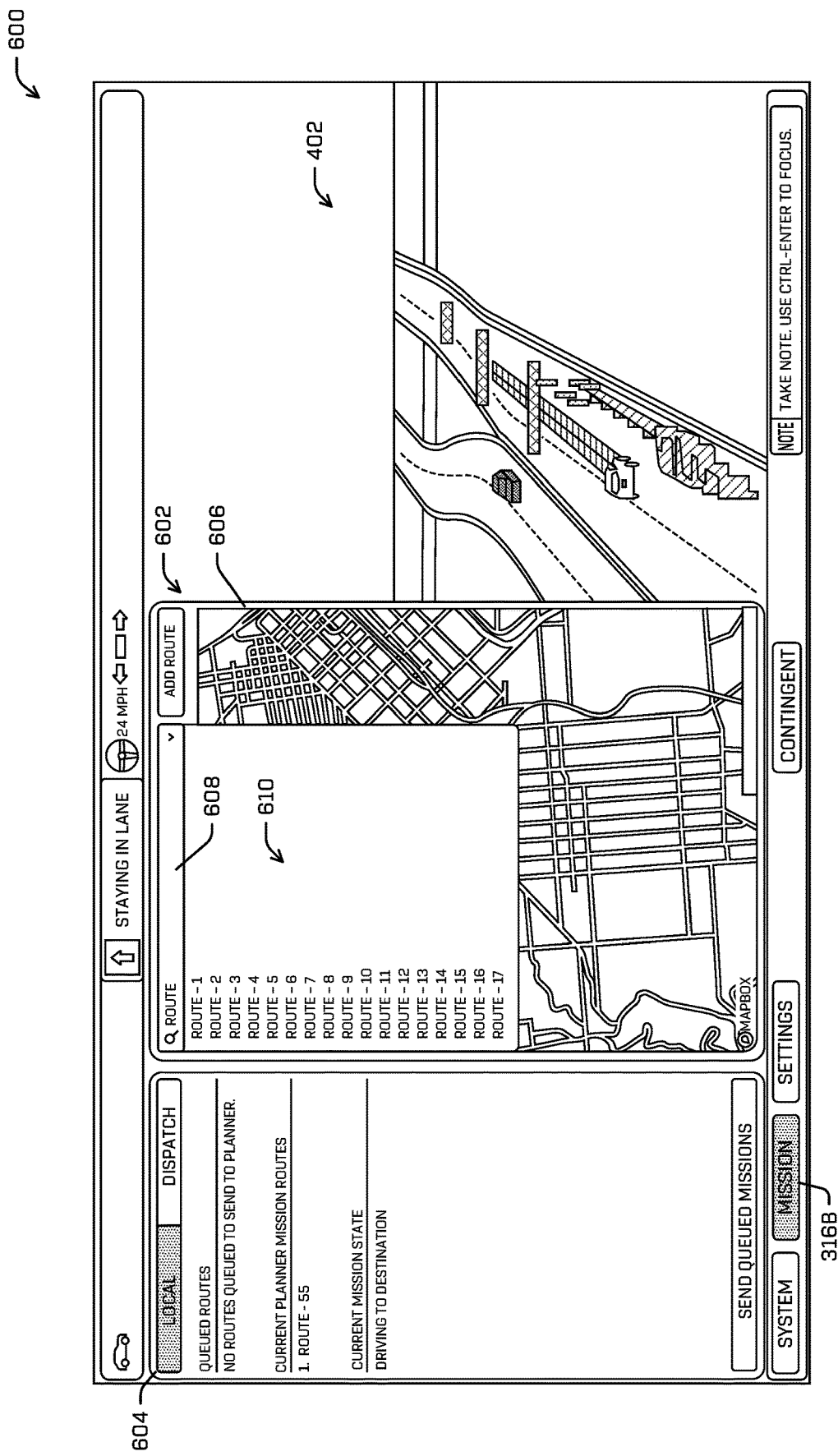
FIG. 6 illustrates yet another user interface that includes an example view of a mission interface.

FIG. 6 illustrates yet another user interface 600 that includes an example view of a mission interface 602 that is displayed on the user interface 600 and partially covering a portion of the digital representation of the environment 402. For instance, the mission interface selection input 316B may have been selected on the user interface 600 and, based at least in part on the selection of the mission interface selection input 316B, the mission interface 602 was displayed on the user interface 600.

In various examples, the mission interface 602 may include a mission status interface 604, a map interface 606, and a mission selection interface 608. The mission status interface 604 may display information associated with current missions and/or queued missions. As used herein, the term "mission" means a route that the vehicle is to navigate. A mission may include one or more waypoints or segments of a road network that are to be navigated by the vehicle to travel from a starting location of the mission to a destination location of the mission. As shown, in FIG. 6, the mission status interface 604 indicates that no routes are queued to send to a planner component of the vehicle, such as the planning component 224. Additionally, the mission status interface 604 indicates that the vehicle is currently driving to a destination location associated with the "Route-55" mission.

The map interface 606 of the mission interface 602 may include a map depicting a road network associated with a current location of the vehicle, a future location of the vehicle, a location associated with a specific mission, etc. In some examples, a route associated with a mission may be presented on the map interface 606 as well as a current location of the vehicle with respect to the route. For instance, a mission may be selected using the mission selection interface 608 and, in response, a route associated with the mission may be displayed on the map interface 606. In some instances, selecting the mission selection interface 608 may cause presentation of multiple missions 610 a user may select from. Additionally, or alternatively, a person using the user interface 600 may search for specific missions using the mission selection interface 608 and multiple missions 610 that are relevant to the search may be displayed for selection. In some examples, when a mission is selected, a name of the mission may appear in the mission status interface 604 as a current mission or a queued mission.

Figure 7A:
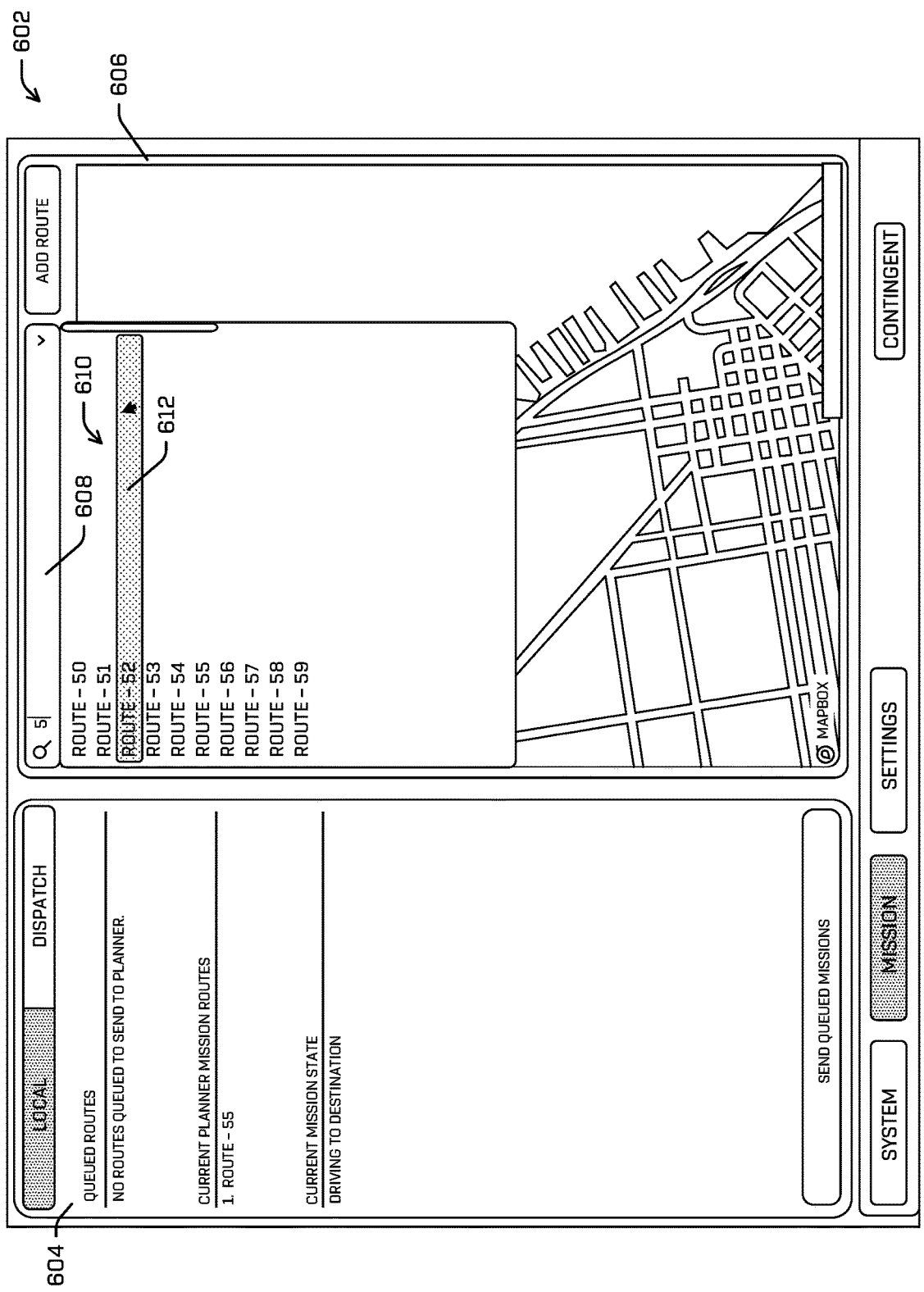
FIGS. 7A-7C illustrate various example views of an example mission interface of a user interface.
Figure 7B:
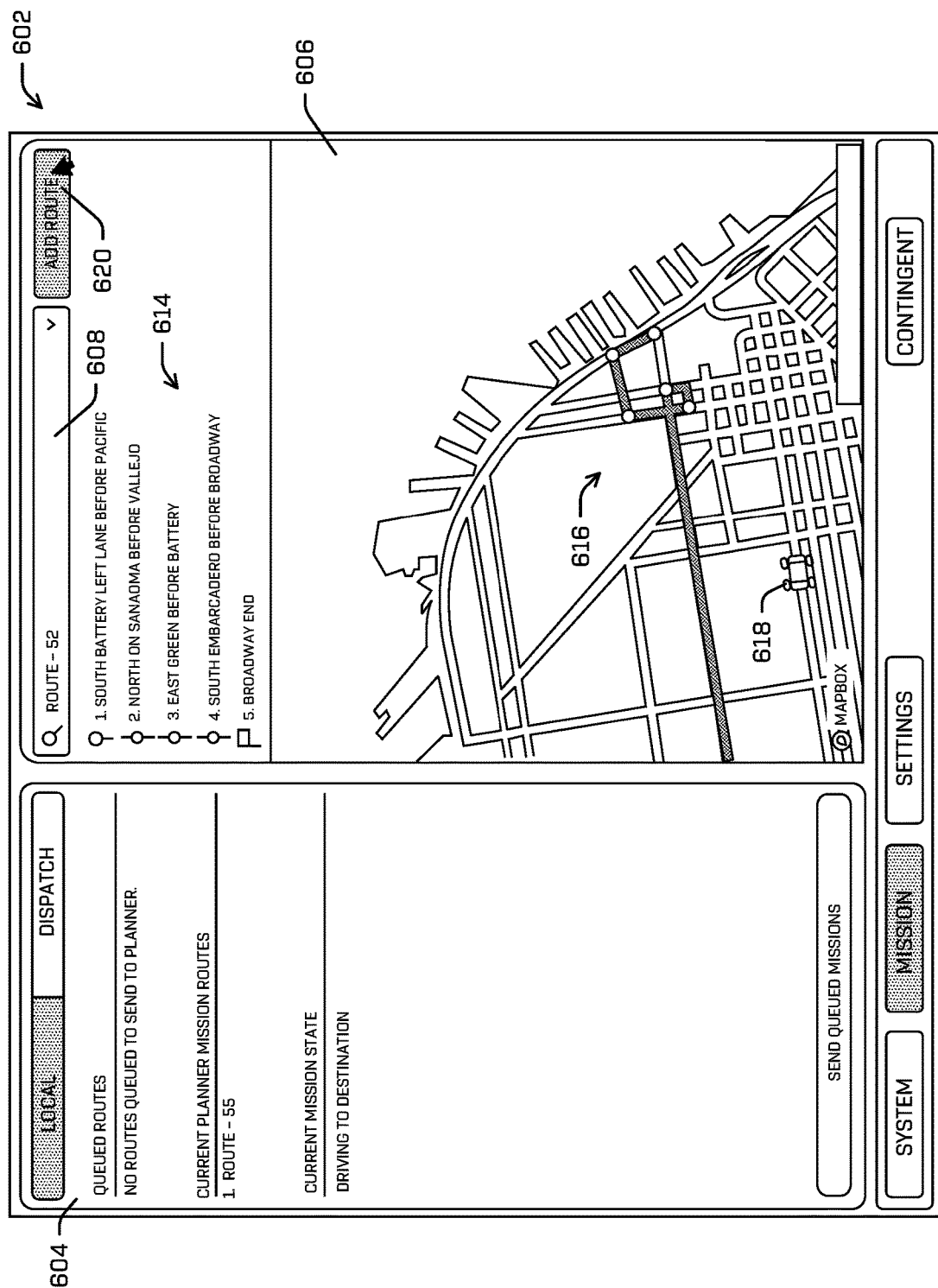
Figure 7C:
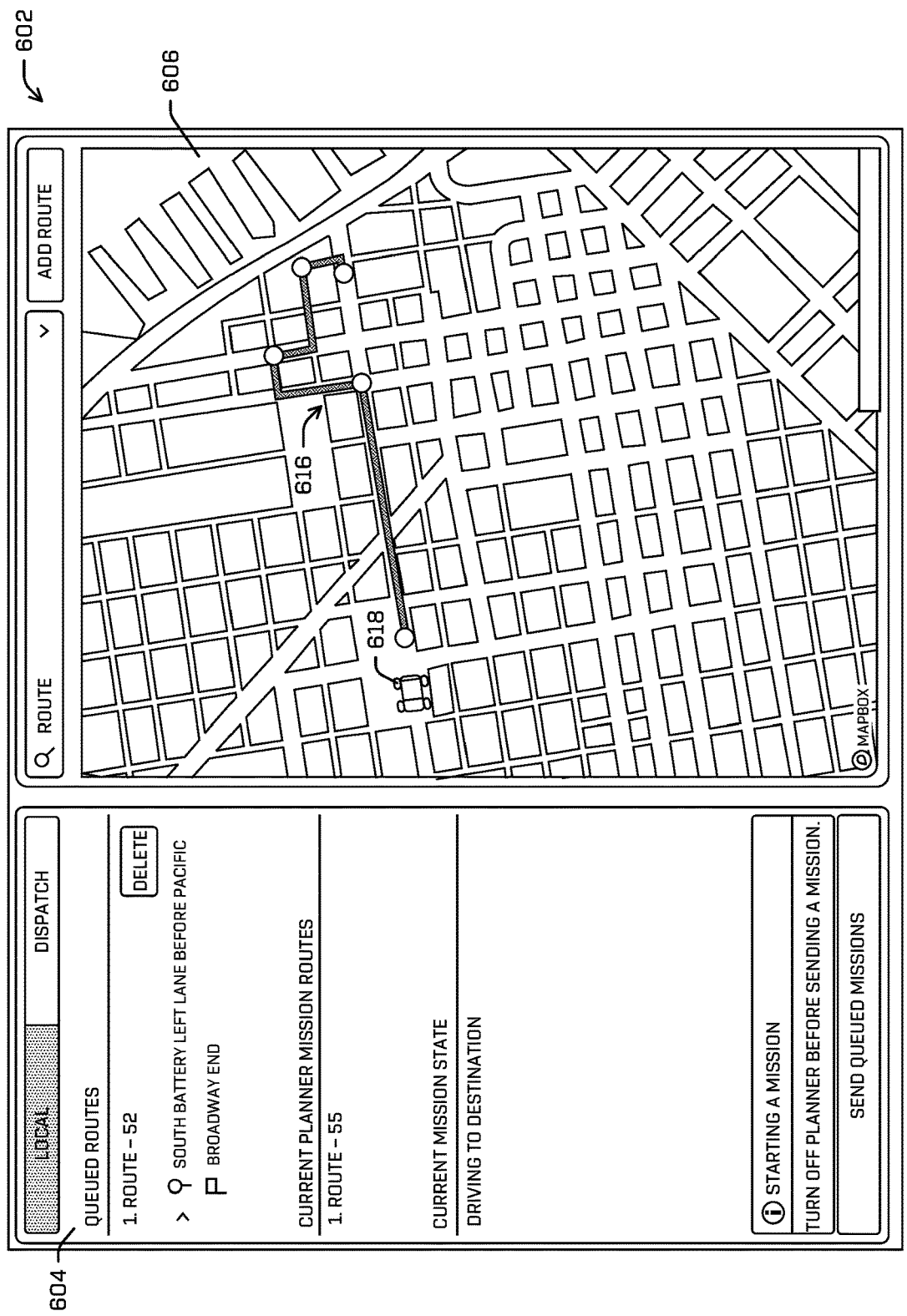

FIGS. 7A-7C illustrate various example views of an example mission interface 602 of a user interface when a mission is selected using the mission interface 602. FIG. 7A illustrates an example of searching for a mission using the mission selection interface 608 and selecting a specific mission 612 of the multiple missions 610 that are displayed for selection based at least in part on the search. As shown, a text field of the mission selection interface 608 has been populated with the text string "5," and the mission selection interface 608 has caused presentation of multiple missions 610 that all include the text string "5." Additionally, the specific mission 612 that is named "ROUTE-52" is shown as being selected using the mouse cursor.

FIG. 7B illustrates and example view of the mission interface 602 after a mission has been selected. As show, a name of the selected mission ("ROUTE-52") appears within the mission selection interface 608, and one or more route segments 614 are displayed. The one or more route segments 614 may, in some examples, include step-by-step navigational directions or instructions according to which the vehicle is to abide by to complete the mission by navigating from a starting location to a destination location. Additionally, in some instances, a route 616 associated with the mission may be displayed on the map interface 606, as well as a current location of the vehicle 618 with respect to the route 616. In some instances, the mission may be added to the mission queue using the add route input 620. In this way, the mission interface 602 may cause data associated with the mission and/or the route to be sent to a planning component of the vehicle.

FIG. 7C illustrates and example view of the mission interface 602 after a mission has been added for the vehicle to complete. In some examples, after the mission has been added, the route 616 associated with the mission may be presented on the map interface 606, as well as a location of the vehicle 618 with respect to the route 616. Additionally, in some instances the mission status interface 604 may be updated to display that the added mission ("ROUTE-52") has been added to a list of queued routes that the vehicle is to navigate.

Figure 8A:
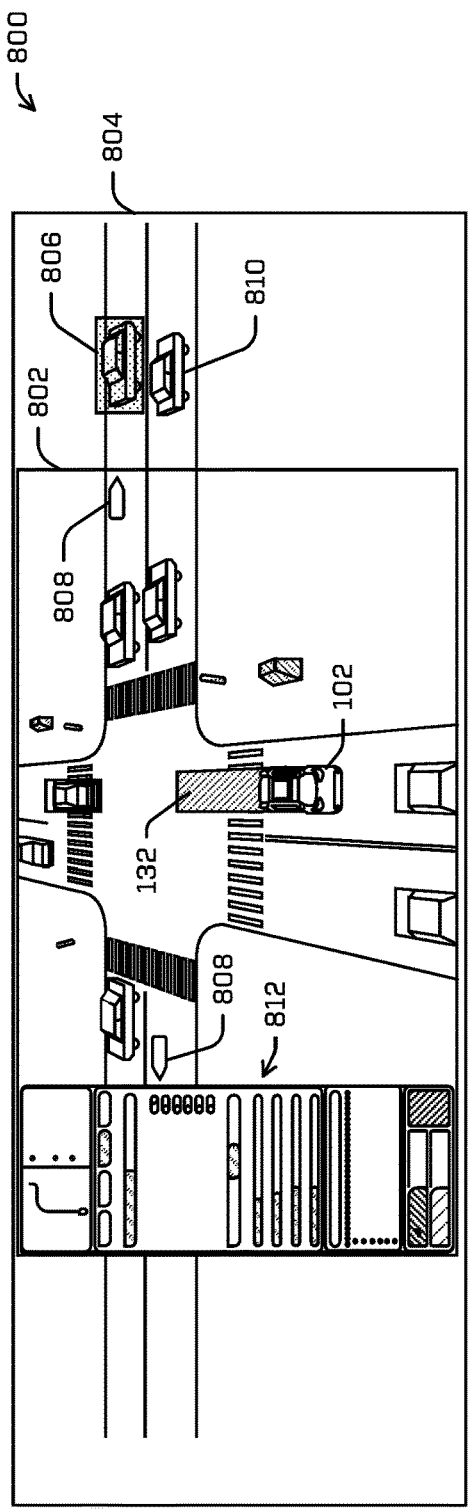
FIGS. 8A and 8B collectively illustrate another example user interface that includes example off-screen indicators to indicate that a vehicle, which is not shown on the example user interface, is approaching the example vehicle.
Figure 8B:
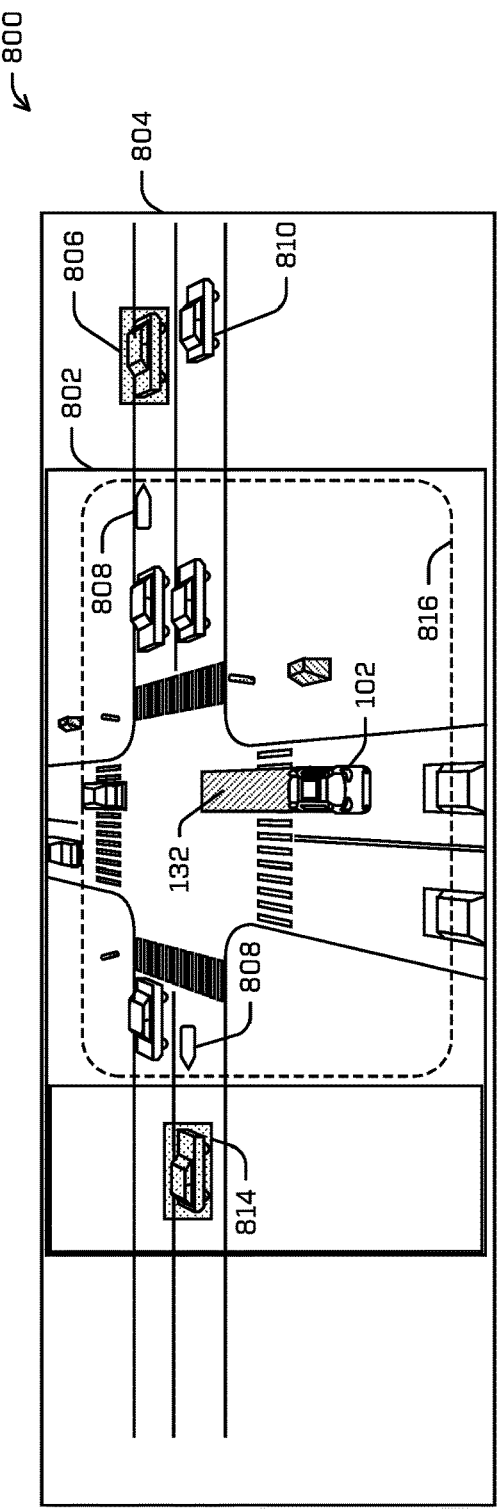

FIGS. 8A and 8B collectively illustrate another example user interface 800 that includes example off-screen indicators 808 to indicate that a vehicle, which is not shown on a display, is approaching the example vehicle 102. In some examples, the user interface 800 may include a first field-of-view 802 that is capable of being presented on a display. However, the vehicle 102 may be able to detect the presence of objects that are located outside the first field-of-view in a second field-of-view 804. In some examples, however, a display that is presenting the user interface 800, such as a display of the laptop computer 146 or a display 148 of the vehicle 102, may not be large enough to contain a complete graphical representation of the entire second field-of-view 804. For instance, the field-of-view that is displayed on the user interface may be optimized for a user to detect safety critical issues. In other words, although it may be possible for a larger field-of-view to be displayed, the user interface may limit the amount of data (e.g., number of objects) that is presented on the display by restricting the size of the field-of-view such that the user interface includes only immediately relevant data. Additionally, or alternatively, the view of the digital representation of the environment presented on the display may be zoomed in to show additional detail, and the off-screen objects may not be displayed. As such, the vehicle 102 may be responding (e.g., stopping, yielding, or otherwise reacting) to an object, such as the detected vehicle 806, that is not viewable to a person using the user interface 800.

In some examples, the first field-of-view 802 may be from one or more different perspectives (e.g., third person perspective from above and behind the vehicle 102, first person perspective from an interior of the vehicle 102, a top-down perspective from above the vehicle 102, etc.) Additionally, in some instances the perspective of the first field-of-view 802 may change based at least in part on one or more situational aspects associated with the vehicle 102. For instance, if the vehicle 102 is near an intersection, the perspective viewpoint of the first field-of-view 802 may comprise a top-down perspective view, or if the vehicle 102 is driving straight down the highway the first field-of-view may comprise a third person perspective view from above and behind the vehicle 102, as shown in FIGS. 8A and 8B, etc.

Additionally, or alternatively, although a detected object 814 may otherwise be located within the first field-of-view 802, the detected object 814 may be obstructed from view by an interface region 812 that is presented on the user interface 800. Accordingly, off-screen indicators 808 may be used to present indications of detected objects 814 that the vehicle 102 may be responding to that are located outside of a canvas 816, but nonetheless still located within the first field-of-view 802.

In some examples, only detectable objects that the vehicle may be responding to may be represented with off-screen notifications 808. For instance, the vehicle 102 may detect that another vehicle 810 is located within the second field-of-view 804. However, an off-screen notification 808 may not be presented on the user interface 800 to indicate the presence of the other vehicle 810 because the direction of travel (e.g., trajectory) of the other vehicle 810 is moving away from the vehicle 102. In some examples, the off-screen notifications 908 may indicate the direction in which detected objects 806 and/or 814 are approaching the vehicle 102 from, a type of object associated with the detected objects 806 and/or 814 (e.g., whether the detected objects are a vehicle, pedestrian, bicyclist, etc.), an estimated amount of time until the detected objects 806 and/or 814 are within the first field-of-view 802 and/or the canvas 816, a position on the user interface 800 in which the detected objects 806 and/or 814 are predicted to first appear, and the like. In some examples, whether off-screen notifications 808 are presented on the user interface 800 may be based at least in part on a speed determined for the detected objects 806 and/or 814, an amount of time until the detected objects 806 and/or 814 enter the first field-of-view 802, and/or a size of the detected objects 806 and/or 814.

Example Methods

Figure 9:
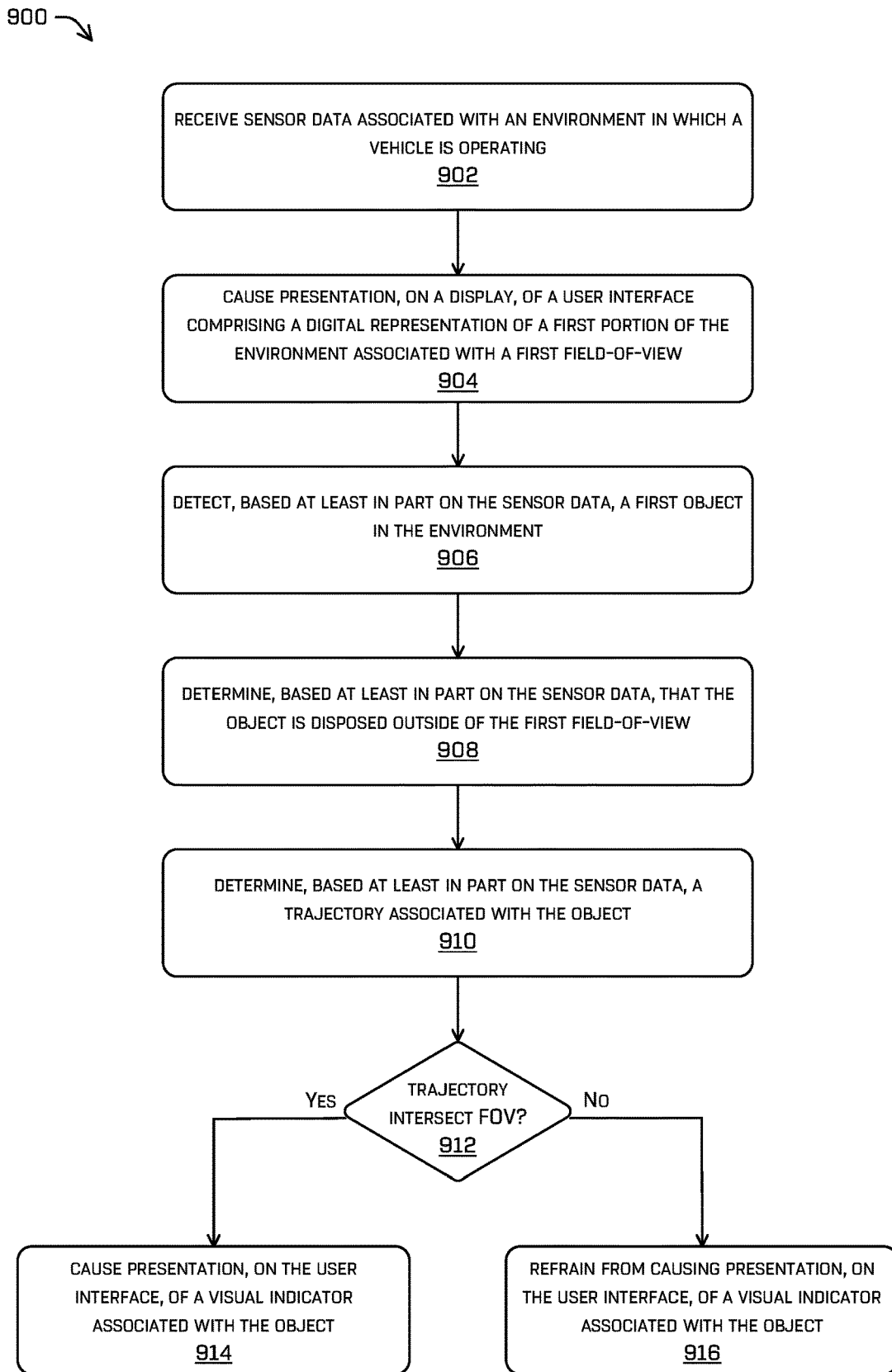
FIG. 9 is a flowchart illustrating an example method of presenting a user interface on a display for monitoring and/or controlling a vehicle, as well as for presenting off-screen notifications on the user interface to indicate the presence of objects that may be relevant to operation of the vehicle.
Figure 10:
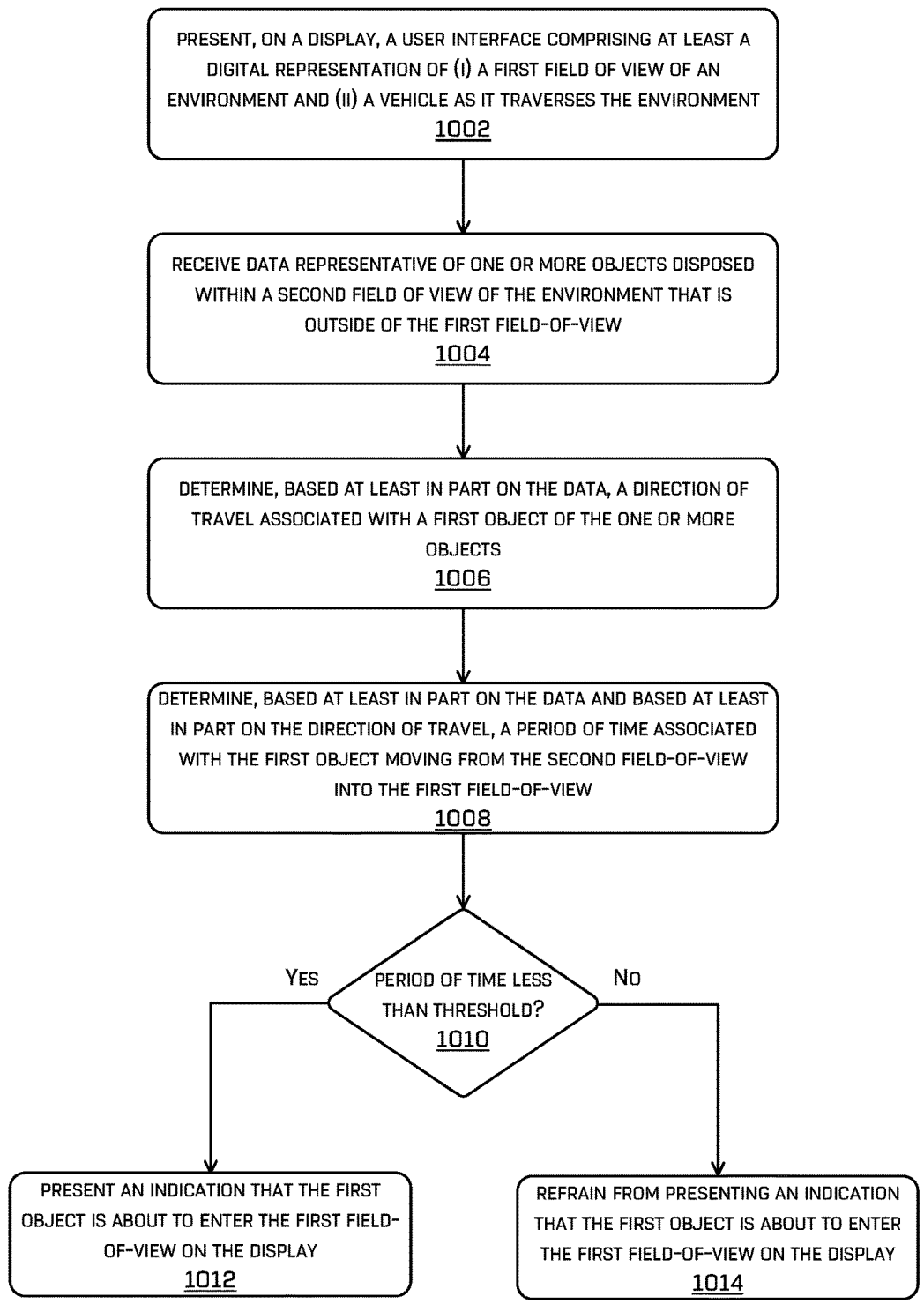
FIG. 10 is a flowchart illustrating another example method of presenting a user interface on a display for monitoring and/or controlling a vehicle, as well as for presenting off-screen notifications on the user interface to indicate the presence of objects that may be relevant to operation of the vehicle.

FIGS. 9-10 are flowcharts showing example methods of presenting various user interfaces on a display that are associated with monitoring a vehicle. The methods illustrated in FIGS. 9-10 are described with reference to one or more of the vehicles, systems, and/or user interfaces described in FIGS. 1-8B for convenience and ease of understanding. However, the methods illustrated in FIGS. 9-10 are not limited to being performed using the vehicles, systems, and/or user interfaces described in FIGS. 9-10, and may be implemented using any of the other vehicles, systems, and user interfaces described in this application, as well as vehicles, systems, and user interfaces other than those described herein. Moreover, the vehicles, systems, and user interfaces described herein are not limited to performing the methods illustrated in FIGS. 9-10.

The methods 900, and 1000 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the methods 900, and 1000 may be combined in whole or in part with each other or with other methods.

FIG. 9 is a flowchart illustrating another example method 900 of presenting a user interface on a display for monitoring and/or controlling a vehicle, as well as for presenting off-screen notifications on the user interface to indicate the presence of objects that the vehicle may be responding to. At operation 902, the method 900 includes receiving sensor data associated with an environment in which a vehicle is operating. For instance, the sensor data may be generated by one or more of the sensor systems 206 of the vehicle 202.

At operation 904, the method 900 includes causing presentation, on a display, of a user interface comprising a digital representation of a first portion of the environment associated with a first field-of-view. For instance, the user interface may be presented on a display of a laptop computer 146, display 148 of the vehicle 102, or another display of an electronic device (e.g., smartphone, tablet, etc.) In some examples, the first portion of the environment may comprise a digital representation of the vehicle in the environment. Additionally, the first field-of-view may be from a perspective above and behind the vehicle and include a portion of the environment in front of a direction of travel of the vehicle.

At operation 906, the method 900 includes detecting, based at least in part on the sensor data, a first object in the environment. For instance, the first object may comprise another vehicle that is disposed in the environment. At operation 908, the method 900 includes determining, based at least in part on the sensor data, that the object is disposed outside of the first field-of-view. For instance, determining that the object is disposed outside of the first field-of-view may include determining that the object is within a second field-of-view that is outside the first field-of-view.

At operation 910, the method 900 includes determining, based at least in part on the sensor data, a trajectory associated with the object. The trajectory associated with the object may indicate a direction of travel in which the object is moving. At operation 912, the method 900 includes determining whether the trajectory associated with the object intersects the first field-of-view. That is, determining whether the direction of travel in which the object is moving will cause the object to appear on the user interface.

At operation 914, if the trajectory associated with the object does intersect the first field-of-view, the method 900 may include causing presentation, on the user interface, of a visual indicator associated with the object. In some examples, the visual indicator may be presented on the user interface at a position that corresponds with a predicted location in which the object may first appear on the user interface.

Conversely, at operation 916, if the trajectory associated with the object does not intersect the first field-of-view, the method 900 may include refraining from causing presentation, on the user interface, of the visual indicator associated with the object. For instance, if the trajectory of the object is directed away from the first field-of-view, then the method 900 may include refraining from presenting the visual indicator.

FIG. 10 is a flowchart illustrating yet another example method 1000 of presenting a user interface on a display for the remote monitoring and/or controlling of a vehicle, as well as for presenting off-screen notifications on the user interface to indicate the presence of objects that the vehicle may be responding to. The method 1000 begins at operation 1002, which includes presenting, on a display, a user interface comprising at least a digital representation of (i) a first field-of-view of an environment and (ii) a vehicle as it traverses the environment. In some instance, the user interface may be presented on a display of a laptop computer 146 or a display 148 of the vehicle 102.

At operation 1004, the method 1000 includes receiving data representative of one or more objects disposed within a second field-of-view of the environment that is outside of the first field-of-view. Additionally, or alternatively, data may be received that is representative of one or more objects that are disposed within the first field-of-view, but that are otherwise obstructed from being viewed by a person using the user interface. For instance, the one or more objects may be obstructed from view by an interface region of the user interface.

At operation 1006, the method 1000 includes determining, based at least in part on the data, a direction of travel associated with a first object of the one or more objects. For instance, a trajectory may be determined for the first object. At operation 1008, the method 1000 includes determining, based at least in part on the data and based at least in part on the direction of travel, a period of time associated with the first object moving from the second field-of-view into the first field-of-view.

At operation 1010, the method 1000 includes determining whether the period of time is less than a threshold period of time. In some examples, the threshold period of time may include a predefined amount of time, such as one second, two seconds, five seconds, ten seconds, and so forth. At operation 1012, the method 1000 includes presenting an indication that the first object is about to enter the first field-of-view on the display. In some examples, presenting the indication may be based at least in part on the period of time being less than the threshold period of time.

Alternatively, at operation 1014, the method 1000 includes refraining from presenting an indication that the first object is about to enter the first field-of-view on the display. For instance, if the period of time is greater than the threshold period of time, then the method may refrain from presenting the indication.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

A. A system comprising: one or more processors; and one or more computer-readable media storing instructions that, when executed by the one or more processors, cause the system to perform operations comprising: causing presentation, on a display, of a user interface that is associated with a vehicle, the user interface comprising: a first portion comprising a digital representation of a portion of an environment in which the vehicle operates; and a second portion comprising a system interface, the system interface comprising multiple control inputs for controlling components or systems of the vehicle and multiple diagnostic messages that are associated with the components or systems of the vehicle; receiving, via a first control input of the multiple control inputs, first data indicating that a first component or system of the vehicle is to be activated or deactivated; based at least in part on the first data, sending a signal to a computing device associated with the vehicle to cause the first component or system to activate or deactivate; receiving second data representing a first diagnostic message associated with the first component or system, the first diagnostic message indicating a status associated with the first component or system; and based at least in part on the second data, causing presentation of the first diagnostic message within the system interface and proximate the multiple diagnostic messages.

B. The system as paragraph A recites, wherein the user interface further comprises a note-taking interface, the operations further comprising receiving an input indicating a request to copy data associated with the first diagnostic message into a text field of the note-taking interface such that the data is stored in a memory associated with the vehicle.

C. The system as any one of paragraphs A-B recite, further comprising: receiving third data via an input element of the system interface that is configured to cause presentation of additional diagnostic messages; and based at least in part on the third data, causing presentation of the additional diagnostic messages while suppressing presentation of the multiple control inputs.

D. The system as any one of paragraphs A-C recite, wherein the multiple components or systems of the vehicle comprise at least one of a radar system, a perception system, a lidar system, a localization system, or a vision system.

E. A method comprising: causing presentation, on a display, of a user interface that is associated with a vehicle, the user interface comprising: a representation of an environment in which the vehicle operates; and a system interface comprising an input element for controlling a component or system of the vehicle; receiving, via the input element, an indication that the component or system is to be activated or deactivated; based at least in part on the indication, sending a signal to the component or system to cause the component or system to activate or deactivate; receiving data representing a notification associated with the component or system; and based at least in part on the data, causing presentation of the notification within the system interface.

F. The method as paragraph E recites, wherein the notification comprises a diagnostic message that is indicative of a status associated with the component or system of the vehicle, the status comprising at least one of a normal state, a stale state, a warning state, or an error state.

G. The method as any one of paragraphs E-F recites, wherein the component or system of the vehicle comprises at least one of a radar system, a perception system, a lidar system, a localization system, or a vision system.

H. The method as any one of paragraphs E-G recites, further comprising: receiving a first input signal associated with the notification; based at least in part on the input signal, causing presentation, on the display, of data associated with the notification; receiving a second input signal associated with copying the data associated with the notification; and based at least in part on the second input signal, storing the data associated with the notification in a memory associated with the vehicle.

I. The method as any one of paragraphs E-H recites, wherein: the input element comprises a first input element of multiple input elements of the system interface, the multiple input elements configured to activate or deactivate components or systems of the vehicle; the system interface further comprises multiple notifications associated with the components or systems of the vehicle; and the method further comprises causing presentation of the multiple notifications and additional notifications based at least in part on receiving an input signal associated with the additional notifications.

J. The method as any one of paragraphs E-I recites, wherein the input element comprises a first control input of multiple control inputs of the system interface, the multiple control inputs being configured to activate or deactivate components or systems of the vehicle, the method further comprising: receiving input data associated with a second input element that is configured to activate or deactivate the components or systems of the vehicle; determining, based at least in part on the input data, whether a period of time associated with the input data meets or exceeds a threshold period of time; and based at least in part on the period of time meeting or exceeding the threshold period of time, sending a signal to the vehicle to cause the components or systems of the vehicle to activate or deactivate.

K. The method as any one of paragraphs E-J recites, wherein the user interface further comprises multiple interface elements, the method further comprising: receiving an indication associated with a mission interface element of the multiple interface elements; based at least in part on the indication associated with the mission interface element, causing presentation of a mission interface including a route element and a map interface; receiving, via the route element, an indication of a route that is to be traversed by the vehicle; and based at least in part on the indication of the route, causing presentation, on the map interface, of the route and a position of the vehicle with respect to the route.

L. The method as any one of paragraphs E-K recites, further comprising, based at least in part on the indication of the route, sending route data to the vehicle, wherein the route data is configured to cause the vehicle to traverse the environment according to the route.

M. The method as any one of paragraphs E-L recites, further comprising: receiving data representing an object that is disposed within the environment; and based at least in part on the data, causing presentation of a representation of the object within the representation of the environment, wherein a shape of the representation of the object visually conveys an object type associated with the object.

N. The method as any one of paragraphs E-M recites, wherein the object comprises a pedestrian, the method further comprising: determining, based at least in part on the data, that the vehicle is to yield to the pedestrian; and modifying the representation of the pedestrian to visually indicate that the vehicle is to yield to the pedestrian.

O. The method as any one of paragraphs E-N recites, wherein the indication comprises a first indication that the component or system is to be activated and the input element comprises a status indicator that is configured to visually convey a status associated with the component or system, the method further comprising: based at least in part on the first indication, updating the status indicator to visually indicate that the component or system is activating; receiving, via the input element, a second indication that the component or system is to be deactivated; and based at least in part on the second indication, updating the status indicator to visually indicate that the component or system is deactivating.

P. The method as any one of paragraphs E-O recites, further comprising: receiving, via an input element that is presented on the display, second data indicating that a mapping interface is to be opened, wherein the mapping interface is configured to at least indicate one or more routes associated with navigating the vehicle from a first location to a second location; presenting, on the display and based at least in part on the second data, the mapping interface; receiving, via a first input element of the mapping interface, third data indicating a destination point; presenting, on the mapping interface and based at least in part on the third data, a first route associated with navigating the vehicle from a current location of the vehicle to the destination point; receiving, via a second input element of the mapping interface, fourth data indicating that the vehicle is to navigate to the destination point according to the first route; and based at least in part on the fourth data, causing the vehicle to navigate from the current location of the vehicle to the destination point according to the first route.

Q. A non-transitory computer-readable storage medium storing instructions that, when executed by one or more computing devices, cause the one or more computing devices to perform operations comprising: causing presentation, on a display, of a user interface that is associated with a vehicle, the user interface comprising: a representation of an environment in which the vehicle operates; and a system interface comprising an input element for controlling a component or system of the vehicle and a notification associated with the component or system of the vehicle; receiving, via the input element, an indication that the component or system is to be activated or deactivated; based at least in part on the indication, sending a signal to the vehicle to cause the component or system to be activated or deactivated; receiving data representing another notification associated with the component or system; and based at least in part on the data, causing presentation of the other notification within the system interface proximate the notification.

R. The non-transitory computer-readable storage medium as paragraph Q recites, wherein: the system interface comprises multiple notifications associated with components or systems of the vehicle; the multiple notifications are visually presented as a timeline within the system interface, the timeline indicating an order in which individual notifications of the multiple notifications were received; and an individual notification of the timeline visually indicates a severity associated with the individual notification.

S. The non-transitory computer-readable storage medium as any one of paragraphs Q-R recites, wherein the notification and the other notification comprise diagnostic messages that are indicative of a status associated with the component or system of the vehicle, the status comprising at least one of a normal state, a stale state, a warning state, or an error state.

T. The non-transitory computer-readable storage medium as any one of paragraphs Q-S recites, wherein: the input element comprises a first input element of multiple input elements of the system interface, the multiple input elements configured to activate or deactivate components or systems of the vehicle; the system interface comprises multiple notifications associated with the components or systems of the vehicle; and the method further comprises causing presentation of the multiple notifications and additional notifications based at least in part on receiving an input signal associated with the additional notifications.

U. The non-transitory computer-readable storage medium as any one of paragraphs Q-T recites, wherein the input element comprises a first control input of multiple control inputs of the system interface, the multiple control inputs being configured to activate or deactivate components or systems of the vehicle, the method further comprising: receiving input data associated with a second input element that is configured to activate or deactivate the components or systems of the vehicle; determining, based at least in part on the input data, whether a period of time associated with the input data meets or exceeds a threshold period of time; and based at least in part on the period of time meeting or exceeding the threshold period of time, sending a signal to the vehicle to cause the components or systems of the vehicle to activate or deactivate.

V. A system comprising: one or more processors; and one or more computer-readable media storing instructions that, when executed by the one or more processors, cause the system to perform operations comprising: receiving data associated with an environment in which a vehicle is operating; causing presentation, on a display associated with the vehicle, of a user interface comprising information associated with the vehicle, the user interface comprising a digital representation of a first portion of the environment associated with a first field-of-view; determining, based at least in part on the data, an object disposed within a second portion of the environment that is outside the first field-of-view; determining, based at least in part on the data, a trajectory associated with the object; determining that the trajectory intersects with the first field-of-view; based at least in part on the trajectory, determining a period of time associated with the object intersecting the first field-of-view; and based at least in part on the period of time being less than a threshold period of time, causing presentation, on the user interface, of a visual indicator that the object is approaching the first field-of-view from a direction that is associated with the trajectory.

W. The system as paragraph U recites, the operations further comprising: determining, based at least in part on the data, an object type associated with the object; determining that at least one of the object or the vehicle has moved such that the object is in the first field-of-view; removing the visual indicator; and presenting, on the user interface, a digital representation of the object that corresponds with the object type.

X. The system as any one of paragraphs V-W recites, wherein the object comprises a first object, the operations further comprising: detecting, based at least in part on the data, a second object disposed within the second portion of the environment; determining, based at least in part on the data, a trajectory associated with the second object; determining that the trajectory associated with the second object diverges from the first field-of-view; and based at least in part on the trajectory associated with the second object diverging from the first field-of-view, refraining from causing presentation, on the user interface, of a visual indicator that is associated with the second object.

Y. A method comprising: receiving data associated with an environment in which a vehicle is operating; causing presentation, on a display, of a user interface comprising a digital representation of a first portion of the environment associated with a first field-of-view; determining, based at least in part on the data, a first object in the environment; determining, based at least in part on the data, that the object is disposed outside of the first field-of-view; determining, based at least in part on the data, a trajectory associated with the object; determining that the trajectory intersects with the first field-of-view; and causing presentation, on the user interface, of a visual indicator associated with the object.

Z. The method as paragraph Y recites, further comprising: determining, based at least in part on the data, a period of time associated with the object intersecting the first field-of-view; and determining that the period of time is less than or equal to a threshold period of time, wherein causing presentation of the visual indicator is based at least in part on the period of time being less than or equal to the threshold period of time.

AA. The method as any one of paragraphs Y-Z recites, wherein causing presentation of the visual indicator further comprises causing presentation, on the user interface, of a visual representation of at least one of a speed associated with the object, a proximity of the object to the first field-of-view, an object type associated with the object, or a period of time until the object enters the first field-of-view.

BB. The method as any one of paragraphs Y-AA recites, wherein causing presentation of the visual indicator comprises causing presentation of the visual indicator such that the visual indicator is positioned at a location on the user interface that is proximate a predicted location where the object is predicted to intersect the first field-of-view.

CC. The method as any one of paragraphs Y-BB recites, further comprising: determining, based at least in part on the data, a speed associated with the object; determining that the speed is greater than or equal to a threshold speed; and wherein causing presentation of the visual indicator is further based at least in part on the speed being greater than or equal to the threshold speed.

DD. The method as any one of paragraphs Y-CC recites, further comprising determining the first field-of-view based at least in part on at least one of input data associated with setting the first field-of-view, a number of objects in the environment, or a location of the vehicle with respect to the environment.

EE. The method as any one of paragraphs Y-DD recites, further comprising: determining, based at least in part on the data, that the second object has moved from the first location to a second location; determining that the vehicle is to yield to the second object when the second object is at the second location; and updating the digital representation of the second object to indicate that the vehicle is to yield to the second object.

FF. The method as any one of paragraphs Y-EE recites, further comprising: detecting, based at least in part on the data, a second object in the environment; determining, based at least in part on the data, that the second object is disposed outside of the first field-of-view; determining, based at least in part on the data, an attribute associated with the second object; and based at least in part on the attribute, refraining from causing presentation, on the user interface, of a visual indicator that is associated with the second object.

GG. The method as any one of paragraphs Y-FF recites, wherein the attribute comprises at least one of a trajectory of the second object, a speed of the second object, a proximity of the second object to the first field-of-view, an object type associated with the object, or a predicted time until the second object intersects with the first field-of-view.

HH. The method as any one of paragraphs Y-GG recites, further comprising: causing presentation of an interface window that is configured to provide information associated with at least one of the vehicle or occupants of the vehicle; and wherein determining that the first object is disposed outside of the first field-of-view comprises determining that a location of the first object with respect to the vehicle as observed from the first field-of-view is obstructed by the interface window.

II. The method as any one of paragraphs Y-HH recites, further comprising: detecting, based at least in part on the data, a second object that is disposed outside the first field-of-view; determining, based at least in part on the data, a classification of the second object; and refraining from causing presentation, on the user interface, of a visual indicator that is associated with the second object.

JJ. The method as any one of paragraphs Y-II recites, wherein the digital representation of a first portion of the environment comprises a digital representation of the vehicle in the environment.

KK. The method as any one of paragraphs Y-JJ recites, wherein the first field-of-view is from a perspective above and behind the vehicle and includes a portion of the environment in front of a direction of travel of the vehicle.

LL. The method as any one of paragraphs Y-KK recites, further comprising causing output of an audible indication associated with the object.

MM. A non-transitory computer-readable storage medium storing instructions that, when executed by one or more computing devices, cause the one or more computing devices to perform operations comprising: receiving data associated with an environment in which a vehicle is operating; causing presentation, on a display, of a user interface comprising a digital representation of a first portion of the environment associated with a first field-of-view; determining, based at least in part on the data, a first object in the environment; determining, based at least in part on the data, that the object is disposed outside of the first field-of-view; determining, based at least in part on the data, a trajectory associated with the object; determining that the trajectory intersects with the first field-of-view; and causing presentation, on the user interface, of a visual indicator associated with the object.

NN. The non-transitory computer-readable storage medium as paragraph MM recites, wherein causing presentation of the visual indicator further comprises causing presentation, on the user interface, of a visual representation of at least one of a speed associated with the object, a proximity of the object to the first field-of-view, an object type associated with the object, or a period of time until the object enters the first field-of-view.

OO. The non-transitory computer-readable storage medium as any one of paragraphs MM-NN recites, wherein causing presentation of the visual indicator comprises causing presentation of the visual indicator such that the visual indicator is positioned at a location on the user interface that is proximate a predicted location where the object is predicted to intersect the first field-of-view.

PP. The non-transitory computer-readable storage medium as any one of paragraphs MM-OO recites, the operations further comprising: detecting a second object in the environment; determining a first location of the second object with respect to the vehicle; causing presentation, on the user interface, of a digital representation of the second object at the first location; determining that the second object has moved from the first location to a second location; determining that the vehicle is to yield to the second object when the second object is at the second location; and updating the digital representation of the second object to indicate that the vehicle is to yield to the second object.

QQ. The non-transitory computer-readable storage medium as any one of paragraphs MM-PP recites, the operations further comprising: causing presentation, on a portion of the display that at least partially obstructs the first field-of-view, of an interface window that is configured to provide information associated with at least one of the vehicle or occupants of the vehicle; and wherein determining that the first object is disposed outside of the first field-of-view comprises determining that a location of the first object with respect to the vehicle as observed from the first field-of-view is obstructed by the interface window.

RR. The non-transitory computer-readable storage medium as any one of paragraphs MM-QQ recites, the operations further comprising: detecting, based at least in part on the data, a second object that is disposed outside the first field-of-view; determining, based at least in part on the data, a classification of the second object; and refraining from causing presentation, on the user interface, of a visual indicator that is associated with the second object.

While the example clauses described above are described with respect to one particular implementation, it should be understood that, in the context of this document, the content of the example clauses may also be implemented via a method, device, system, a computer-readable medium, and/or another implementation.

Conclusion

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions that, when executed by the one or more processors, cause the system to perform operations comprising:
receiving data associated with an environment in which a vehicle is operating;
causing presentation, on a display associated with the vehicle, of a user interface comprising information associated with the vehicle, the user interface comprising a digital representation of a first portion of the environment associated with a first field-of-view;
determining, based at least in part on the data, that a representation associated with an object present in the environment is omitted from the user interface based on the object being disposed within a second portion of the environment that is outside the first field-of-view;
determining, based at least in part on the data, that a trajectory associated with the object intersects with the first field-of-view; and
based at least in part on the representation associated with the object being omitted from the user interface and based at least in part on an action being performed by the vehicle responsive to the object, causing presentation, on the user interface, of a visual indicator that the object is approaching the first field-of-view from a direction that is associated with the trajectory.

2. The system of claim 1, the operations further comprising:
determining, based at least in part on the data, an object type associated with the object;
determining that at least one of the object or the vehicle has moved such that the object is in the first field-of-view;
removing the visual indicator; and
presenting, on the user interface, the representation associated with the object that corresponds with the object type.

3. The system of claim 1, wherein the object comprises a first object, the operations further comprising:
detecting, based at least in part on the data, a second object disposed within the second portion of the environment;
determining, based at least in part on the data, a trajectory associated with the second object;
determining that the trajectory associated with the second object diverges from the first field-of-view; and
based at least in part on the trajectory associated with the second object diverging from the first field-of-view, refraining from causing presentation, on the user interface, of a visual indicator that is associated with the second object.

4. A method comprising:
receiving data associated with an environment in which a vehicle is operating;
causing presentation, on a display, of a user interface comprising a digital-representation of a portion of the environment associated with a first field-of-view;
determining, based at least in part on the data, that an object in the environment is omitted from the user interface based on the object being disposed outside of the first field-of-view; and
based at least in part on the object being omitted from the user interface and a determination that an action of the vehicle is responsive to the object, causing presentation, on the user interface, of a visual indicator associated with the object.

5. The method of claim 4, further comprising:
determining, based at least in part on the data, a period of time associated with the object intersecting the first field-of-view; and
determining that the period of time is less than or equal to a threshold period of time,
wherein causing presentation of the visual indicator is based at least in part on the period of time being less than or equal to the threshold period of time.

6. The method of claim 4, wherein causing presentation of the visual indicator further comprises causing presentation, on the user interface, of a visual representation of at least one of a speed associated with the object, a proximity of the object to the first field-of-view, an object type associated with the object, or a period of time until the object enters the first field-of-view.

7. The method of claim 4, wherein causing presentation of the visual indicator comprises causing presentation of the visual indicator such that the visual indicator is positioned at a location on the user interface that is proximate a predicted location where the object is predicted to intersect the first field-of-view.

8. The method of claim 4, further comprising:
determining, based at least in part on the data, a speed associated with the object;
determining that the speed is greater than or equal to a threshold speed; and wherein causing presentation of the visual indicator is further based at least in part on the speed being greater than or equal to the threshold speed.

9. The method of claim 4, further comprising determining the first field of view based at least in part on at least one of input data associated with setting the first field-of-view, a number of objects in the environment, or a location of the vehicle with respect to the environment.

10. The method of claim 4, further comprising:
determining, based at least in part on the data, that the object has moved from a first location to a second location;
determining that the vehicle is to yield to the object when the object is at the second location; and
updating the digital representation of the object to indicate that the vehicle is to yield to the object.

11. The method of claim 4, further comprising:
detecting, based at least in part on the data, a second object in the environment;
determining, based at least in part on the data, that the second object is disposed outside of the first field-of-view;
determining, based at least in part on the data, an attribute associated with the second object; and
based at least in part on the attribute, refraining from causing presentation, on the user interface, of a visual indicator that is associated with the second object.

12. The method of claim 11, wherein the attribute comprises at least one of a trajectory of the second object, a speed of the second object, a proximity of the second object to the first field-of-view, an object type associated with the object, or a predicted time until the second object intersects with the first field-of-view.

13. The method of claim 4, further comprising:
causing presentation of an interface window that is configured to provide information associated with at least one of the vehicle or occupants of the vehicle; and
wherein determining that the object is disposed outside of the first field-of-view comprises determining that a location of the object with respect to the vehicle as observed from the first field-of-view is obstructed by the interface window.

14. The method of claim 4, wherein determining that the object is omitted from the user interface is further based at least in part on determining that a representation of the object on the user interface is occluded by an interface window associated with the user interface.

15. A non-transitory computer-readable storage medium storing instructions that, when executed by one or more computing devices, cause the one or more computing devices to perform operations comprising:
receiving data associated with an environment in which a vehicle is operating;
causing presentation, on a display, of a user interface comprising a digital representation of a portion of the environment associated with a first field-of-view;
determining, based at least in part on the data, that an object in the environment is omitted from the user interface based on the object being disposed outside of the first field-of-view; and
based at least in part on the object being omitted from the user interface and a determination that an action of the vehicle is responsive to the object, causing presentation, on the user interface, of a visual indicator associated with the object.

16. The non-transitory computer-readable storage medium of claim 15, wherein causing presentation of the visual indicator further comprises causing presentation, on the user interface, of a visual representation of at least one of a speed associated with the object, a proximity of the object to the first field-of-view, an object type associated with the object, or a period of time until the object enters the first field-of-view.

17. The non-transitory computer-readable storage medium of claim 15, wherein causing presentation of the visual indicator comprises causing presentation of the visual indicator such that the visual indicator is positioned at a location on the user interface that is proximate a predicted location where the object is predicted to intersect the first field-of-view.

18. The non-transitory computer-readable storage medium of claim 15, the operations further comprising:
detecting a second object in the environment;
determining a first location of the second object with respect to the vehicle;
causing presentation, on the user interface, of a digital representation of the second object at the first location;
determining that the second object has moved from the first location to a second location;
determining that the vehicle is to yield to the second object when the second object is at the second location; and
updating the digital representation of the second object to indicate that the vehicle is to yield to the second object.

19. The non-transitory computer-readable storage medium of claim 15, the operations further comprising:
causing presentation, on a portion of the display that at least partially obstructs the first field-of-view, of an interface window that is configured to provide information associated with at least one of the vehicle or occupants of the vehicle; and
wherein determining that the object is disposed outside of the first field-of-view comprises determining that a location of the object with respect to the vehicle as observed from the first field-of-view is obstructed by the interface window.

20. The non-transitory computer-readable storage medium of claim 15, the operations further comprising:
detecting, based at least in part on the data, a second object that is disposed outside the first field-of-view;
determining, based at least in part on the data, a classification of the second object; and
refraining from causing presentation, on the user interface, of a visual indicator that is associated with the second object.

* * * * *